US008447946B2

(12) United States Patent
Nakatogawa

(10) Patent No.: US 8,447,946 B2
(45) Date of Patent: May 21, 2013

(54) STORAGE APPARATUS AND HIERARCHICAL DATA MANAGEMENT METHOD FOR STORAGE APPARATUS

(75) Inventor: Yuta Nakatogawa, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 356 days.

(21) Appl. No.: 12/829,079

(22) Filed: Jul. 1, 2010

(65) Prior Publication Data

US 2011/0271071 A1    Nov. 3, 2011

(30) Foreign Application Priority Data

Apr. 28, 2010   (JP) ................................. 2010-103931

(51) Int. Cl.
*G06F 13/00*     (2006.01)
*G06F 7/00*     (2006.01)

(52) U.S. Cl.
USPC ........... 711/165; 711/117; 711/154; 711/171; 707/812

(58) Field of Classification Search .................. 711/103, 711/114, 118, 154, 159, 165, 170, 171, E12.001, 711/E12.002; 707/204, 640, 649, 661, 812
See application file for complete search history.

(56) References Cited

U.S. PATENT DOCUMENTS

| 7,395,396 | B2 * | 7/2008 | Takahashi et al. | ............ 711/165 |
| 2009/0300079 | A1 * | 12/2009 | Shitomi | ........................ 707/204 |

FOREIGN PATENT DOCUMENTS

JP     2006-99748     4/2006

* cited by examiner

*Primary Examiner* — Tuan Thai
*Assistant Examiner* — Zhou Li
(74) *Attorney, Agent, or Firm* — Brundidge & Stanger, P.C.

(57) ABSTRACT

Proposed are a storage apparatus and hierarchical data management method for promoting the effective usage of memory apparatuses while suppressing maintenance-related costs and work. The storage apparatus comprises a plurality of memory apparatuses of a plurality of types, and a control unit for executing required data migration by monitoring an access frequency to each of the unit areas of the virtual volume and by controlling the corresponding memory apparatuses so that the storage area provided by the memory apparatus with a superior response performance is allocated to unit areas for which the access frequency is higher. The control unit controls the corresponding memory apparatuses so that when data is migrated from a first storage area, provided by a first memory apparatus which can be rewritten a limited number of times, to a second storage area provided by another second memory apparatus, the data is migrated to the second storage area without being deleted from the first storage area, manages updated parts of the data migrated from the first storage area to the second storage area after the data is migrated to the second storage area, and controls the corresponding memory apparatuses so that, when data which has been migrated from the first storage area to the second storage area is restored from the second storage area to the first storage area, the corresponding data still remaining in the first storage area is overwritten with the updated parts of the data which are updated after being migrated to the second storage area.

10 Claims, 17 Drawing Sheets

FIG.9

| DATA BLOCK PRIORITY RANKING | | WRITE ACCESS AMOUNT | |
|---|---|---|---|
| | | SMALL | LARGE |
| FORECAST MIGRATION FREQUENCY | LARGE | HIGH | MEDIUM |
| | SMALL | MEDIUM | LOW |

FIG.10

| DATA BLOCK ID | DATA BLOCK STORAGE POINT INFORMATION | MIGRATION-SOURCE DATA BLOCK STORAGE POINT INFORMATION | MIGRATION DATE AND TIME | PRIORITY RANKING |
|---|---|---|---|---|
| DataBlock#1-1 | SSDVolume#3 | - | - | High |
| DataBlock#1-2 | HDDVolume#1 | SSDVolume#1 | 2009/12/01 19:00 | Mid |
| DataBlock#1-3 | HDDVolume#3 | SSDVolume#2 | 2009/12/01 18:00 | Low |
| .. | .. | .. | .. | .. |
| DataBlock#2-1 | HDDVolume#1 | - | - | High |
| DataBlock#2-2 | SSDVolume#2 | - | - | High |
| DataBlock#2-3 | HDDVolume#1 | SSDVolume#2 | 2009/12/02 14:00 | Low |
| .. | .. | .. | .. | .. |
| DataBlock#3-1 | HDDVolume#1 | SDVolume#1 | 2009/12/01 09:00 | Low |
| DataBlock#3-2 | HDDVolume#2 | - | - | Mid |
| DataBlock#3-3 | SSDVolume#1 | - | - | Mid |
| .. | .. | .. | .. | .. |

| VOLUME ID | CAPACITY | USED CAPACITY | USED CAPACITY THRESHOLD |
|---|---|---|---|
| SSDVolume#1 | 700 GB | 350 GB | 80% |
| SSDVolume#2 | 500 GB | 300 GB | 80% |
| : | : | : | : |

| DATA BLOCK ID | PAGE ID | UPDATE |
|---|---|---|
| DataBlock#1-2 | Page#1-2-1 | 0 |
|  | Page#1-2-2 | 0 |
|  | : | : |
| DataBlock#1-3 | Page#1-3-1 | 0 |
|  | Page#1-3-2 | 1 |
|  | : | : |
| DataBlock#2-3 | Page#2-3-1 | 1 |
|  | Page#2-3-2 | 0 |
|  | : | : |
| DataBlock#3-1 | Page#3-1-1 | 1 |
|  | Page#3-1-2 | 1 |
|  | : | : |
| : | : | : |

| HOST ID | ONLINE STATUS | VIRTUAL VOLUME ID | DATA BLOCK ID | PRIORITY RANKING |
|---------|---------------|-------------------|---------------|------------------|
| Host#1  | Online        | Volume#1          | DataBlock#1-1 | High             |
|         |               |                   | DataBlock#1-2 | Mid              |
|         |               |                   | DataBlock#1-3 | Low              |
|         |               |                   | ..            |                  |
|         |               | Volume#2          | DataBlock#2-1 | High             |
|         |               |                   | DataBlock#2-2 | High             |
|         |               |                   | DataBlock#2-3 | Low              |
|         |               |                   | ..            |                  |
|         |               | Volume#3          | DataBlock#3-1 | Low              |
|         |               |                   | DataBlock#3-2 | Mid              |
|         |               |                   | DataBlock#3-3 | Mid              |
|         |               |                   | ..            |                  |
| Host#2  | Offline       | Volume#4          | DataBlock#4-1 | Low              |
|         |               |                   | DataBlock#4-2 | Low              |
|         |               |                   | DataBlock#4-3 | Low              |
|         |               |                   | ..            |                  |
|         |               | Volume#5          | DataBlock#5-1 | Low              |
|         |               |                   | DataBlock#5-2 | Low              |
|         |               |                   | DataBlock#5-3 | Low              |
|         |               |                   | ..            |                  |
| ..      |               |                   |               |                  |

| DATA BLOCK ID | WRITE ACCESS AMOUNT | DATE AND TIME |
|---|---|---|
| DataBlock#1-1 | 255 KB | 2009/12/01 18:00 |
| | 0 KB | 2009/12/01 19:00 |
| | 20 KB | 2009/12/01 20:00 |
| | ⋮ | ⋮ |
| DataBlock#1-2 | 1355 KB | 2009/12/01 18:00 |
| | 2300 KB | 2009/12/01 19:00 |
| | 1420 KB | 2009/12/01 20:00 |
| | ⋮ | ⋮ |
| DataBlock#1-3 | 22542 KB | 2009/12/01 18:00 |
| | 35144 KB | 2009/12/01 19:00 |
| | 28755 KB | 2009/12/01 20:00 |
| | ⋮ | ⋮ |
| ⋮ | ⋮ | ⋮ |

| DATA BLOCK ID | MIGRATION SOURCE VOLUME | MIGRATION DESTINATION VOLUME | MIGRATION DATE AND TIME |
|---|---|---|---|
| DataBlock#1-1 | SSDVolume#1 | HDDVolume#3 | 2009/12/01 10:00 |
| | HDDVolume#3 | SSDVolume#1 | 2009/12/01 15:00 |
| | SSDVolume#1 | HDDVolume#2 | 2009/12/01 18:00 |
| | HDDVolume#2 | SSDVolume#3 | 2009/12/01 20:00 |
| DataBlock#1-2 | HDDVolume#3 | SSDVolume#1 | 2009/12/01 00:00 |
| | SSDVolume#1 | HDDVolume#1 | 2009/12/01 19:00 |
| DataBlock#1-3 | SSDVolume#1 | HDDVolume#3 | 2009/12/01 18:00 |
| ⋮ | ⋮ | ⋮ | ⋮ |

35A   35B   35C   35D   35

STORAGE APPARATUS AND HIERARCHICAL DATA MANAGEMENT METHOD FOR STORAGE APPARATUS

CROSS REFERENCES

This application relates to and claims priority from Japanese Patent Application No. 2010-103931, filed on Apr. 28, 2010, the entire disclosure of which is incorporated herein by reference.

The present invention relates to a storage apparatus and a hierarchical data management method for a storage apparatus and, more particularly, to a hierarchical data management method that can be suitably applied to a storage apparatus which includes SSDs (Solid State Drives) as memory apparatuses and for which a hierarchical storage management system is adopted as a data management system.

BACKGROUND

Conventionally, in an enterprise or the like, data is typically stored in a storage apparatus known as a disk array subsystem in which a plurality of memory apparatuses such as SSD or Hard Disk Drives (HDDs) are installed.

In this type of storage apparatus, RAID (Redundant Array of Inexpensive Disks) groups are configured from one or more memory apparatuses of the same type and logical storage areas called 'volumes' are defined in the storage area provided by the memory apparatuses which a single RAID group comprises. Data from a host computer (referred to hereinafter as a host apparatus) is read/written from/to these volumes.

Note that SSDs are advantageous owing to their superior reliability and responsiveness in comparison to hard disk drives, and hence it is thought that SSDs will be adopted more and more as memory apparatuses in storage apparatuses. However, SSDs have the disadvantage that there are limitations on the number of times they can be rewritten due to the resulting degradation of the semiconductor storage elements, and that the cost per bit is high in comparison with that of hard disk drives.

Hence, as the volumes of data managed by enterprises and other organizations are increasing year by year, the effective usage of storage apparatuses has become an important issue. In order to solve this problem, data management technologies such as hierarchical storage management and Thin Provisioning and so on have conventionally been proposed.

For example, Japanese Patent Laid-Open Publication No. 2006-099748 discloses a hierarchical storage management technology with which volumes that are defined in a storage apparatus are classified into groups called 'storage layers' according to the characteristics of the memory apparatuses providing the storage area such as their reliability and response performance, and with which technology data is arranged in the optimum hierarchical storage volumes according to cost and the number of access inputs/outputs per unit time. Effective usage of memory apparatuses can be achieved using such hierarchical storage management technology.

Furthermore, Thin Provisioning technology is designed to improve the capacity utilization of storage apparatuses. In a normal non-Thin Provisioning volume, a storage area equivalent to the total capacity of the volume is reserved when the volume is created, and hence a corresponding storage area must be pre-prepared.

Meanwhile, in Thin Provisioning technology, a pool (referred to hereinafter as a 'virtual pool') is configured from a plurality of volumes and a 'virtual volume' (labeled as such hereinafter) is built on this virtual pool. This virtual volume is then provided to the host apparatus, and a physical storage area is only allocated, from the volume in the virtual pool, to unit areas (hereinafter referred to as 'data blocks') to which data in the virtual volume is written).

According to such Thin Provisioning technology, a storage area equivalent to the total capacity of the virtual volume need not be prepared even when creating a large-capacity virtual volume. It is sufficient to prepare a storage area only amounting to what is actually used by the host apparatus. The capacity utilization of the storage apparatus can therefore be improved.

SUMMARY

Incidentally, it is believed that effective usage of storage apparatuses can be further promoted by adopting new hierarchical storage management technology that combines the aforementioned conventional hierarchical storage management technology and Thin Provisioning technology.

That is, by classifying the volumes that the virtual pool comprises into a plurality of storage tiers according to response performance, and migrating (relocating) data written to the data blocks of the virtual volume to volumes belonging to other storage tiers depending on the number of access inputs/outputs to/from the data blocks per unit time, the user is able to receive the benefits of both hierarchical storage management technology and Thin Provisioning technology. Accordingly, an improved storage apparatus performance can be expected together with lower costs for introducing the storage apparatus.

The number of access input/outputs per unit time to/from a volume is the sum of the numbers of access input/outputs to/from each of the data blocks in the volume. Hence, a case may be considered where even though the data blocks where access is focused change, the change in the number of access I/O to the volume per unit time is minimal.

The number of access I/O to the data blocks is believed to change in a shorter time than the number of access I/O to the whole volume. Therefore, the migration of block data between volumes is likely to occur frequently with the new hierarchical storage management technology, where the aforementioned data blocks are the management units, in comparison with the conventional hierarchical storage management technology in which the volumes are the management units.

Furthermore, if there is frequent migration of data block data between volumes defined on a storage area provided by SSDs (hereinafter called 'SSD volumes,' and volumes defined on a storage area provided by hard disk devices (hereinafter called 'HDD volumes'), for example, there is an increase in the number of times data is written to the SSDs and the number of times data is deleted from the SSDs due to the data migration, which shortens the lifespan of the SSDs. Such a situation is problematic in that not only are there increased storage apparatus maintenance costs, but also maintenance requires more work.

In view of the above problems, the present invention proposes a storage apparatus and hierarchical data management method for the storage apparatus which serve to promote effective usage of storage apparatuses while minimizing maintenance costs and work.

In order to achieve the foregoing object, the present invention provides a storage apparatus which provides a virtual volume to a host apparatus and which, in response to a write request from the host apparatus with respect to the virtual volume, allocates storage areas dynamically to the virtual volume, the storage apparatus comprising a plurality of memory apparatuses of a plurality of types, and a control unit for executing required data migration by monitoring an access frequency to each of the unit areas of the virtual volume and by controlling the corresponding memory apparatuses so that the storage area provided by the memory apparatus with a superior response performance is allocated to unit areas for which the access frequency is higher. The control unit controls the corresponding memory apparatuses so that when data is migrated from a first storage area, provided by a first memory apparatus which can be rewritten a limited number of times, to a second storage area provided by another second memory apparatus, the data is migrated to the second storage area without being deleted from the first storage area, and the control unit manages updated parts of the data migrated from the first storage area to the second storage area after the data is migrated to the second storage area, and controls the corresponding memory apparatuses so that, when data which has been migrated from the first storage area to the second storage area is restored from the second storage area to the first storage area, the corresponding data still remaining in the first storage area is overwritten with the updated parts of the data which are updated after being migrated to the second storage area.

The present invention further provides a hierarchical data management method of a storage apparatus which provides a virtual volume to a host apparatus and which, in response to a write request from the host apparatus with respect to the virtual volume, allocates storage areas dynamically to the virtual volume, the storage apparatus comprising a plurality of memory apparatuses of a plurality of types, and a control unit for executing required data migration by monitoring an access frequency to each of the unit areas of the virtual volume and by controlling the corresponding memory apparatuses so that the storage area provided by the memory apparatus with a superior response performance is allocated to unit areas for which the access frequency is higher. This hierarchical data management method comprises a first step in which the control unit controls the corresponding memory apparatuses so that when data is migrated from a first storage area, provided by a first memory apparatus which can be rewritten a limited number of times, to a second storage area provided by another second memory apparatus, the data is migrated to the second storage area without being deleted from the first storage area, a second step of managing updated parts of the data migrated from the first storage area to the second storage area after the data is migrated to the second storage area, and a third step of controlling the corresponding memory apparatuses so that, when data which has been migrated from the first storage area to the second storage area is restored from the second storage area to the first storage area, the corresponding data still remaining in the first storage area is overwritten with the updated parts of the data which are updated after being migrated to the second storage area.

According to the present invention, the volume of data that is rewritten in the first memory apparatus when data is restored to the first storage area from the second storage area can be kept to the required minimum. It is therefore possible to prevent the original rewriting of the first memory apparatus from also extending to unnecessary data parts, and prevent any shortening of the first memory apparatus's lifespan due to the frequent rewriting of data. The effective usage of storage apparatuses can accordingly be promoted while minimizing maintenance costs and work due to this shortening of the first memory apparatus's lifespan.

DESCRIPTION OF DRAWINGS

FIG. 9 is a table explaining data block priority rankings;

FIG. 10 is a conceptual view explaining a data block management table;

FIG. 11 is a conceptual view explaining a volume management table;

FIG. 12 is a conceptual view explaining a page management table;

FIG. 13 is a conceptual view explaining a data block priority ranking management table;

FIG. 14 is a conceptual view explaining a data block I/O history table;

FIG. 15 is a conceptual view explaining a data block migration history table;

DETAILED DESCRIPTION

An embodiment of the present invention will be described in detail hereinbelow with reference to the drawings.

Figure 1:
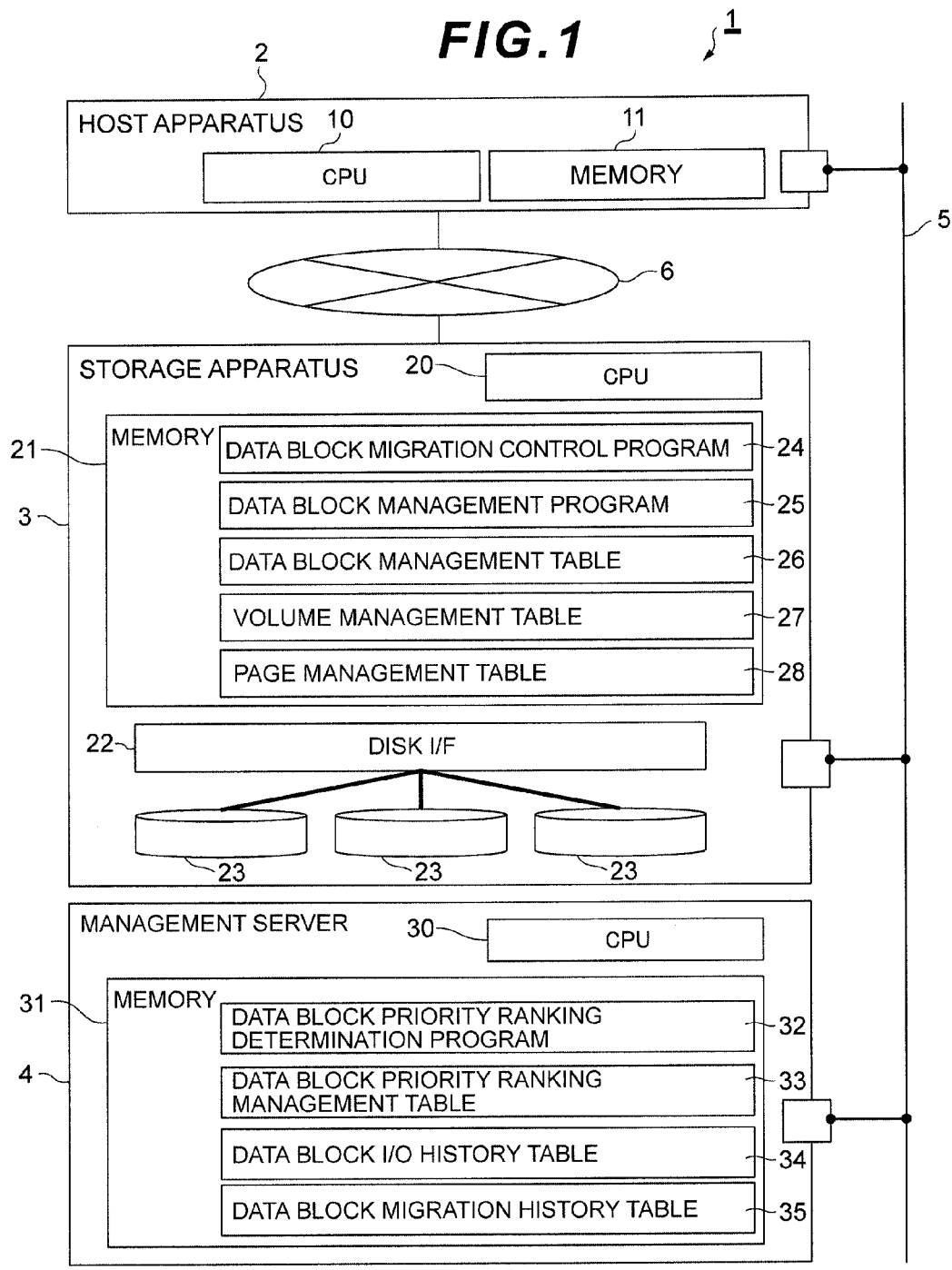
FIG. 1 is a block diagram showing the whole configuration of a computer system according to a first embodiment.

(1) First Embodiment (1-1) Configuration of a Computer System According to this Embodiment In FIG. 1, 1 denotes the whole computer system according to this embodiment. The computer system 1 comprises a host apparatus 2, a storage apparatus 3, and a management server 4. The host apparatus 2, storage apparatus 3, and management server 4 are connected via a management LAN (Local Area Network) 5 and the host apparatus 2 and storage apparatus 3 are connected via a network 6 that is configured from a SAN (Storage Area Network) or the like.

The host apparatus 2 is a computer apparatus equipped with information processing resources such as a CPU (Central Processing Unit) 10 and a memory 11 and so on, and is configured from a personal computer, workstation, mainframe or similar, for example. Application software suited to the user's business operations is installed on the host apparatus 2 and data used by the application software is read from/written to the storage apparatus 3 via the network 6.

The storage apparatus 3 has a built-in Thin Provisioning function for providing a virtual volume to the host apparatus 2 and allocating a storage area dynamically to the virtual volume in accordance with the writing of data from the host apparatus 2 to the virtual volume, and is configured from a CPU 20, a memory 21, a disk interface 22, and a plurality of memory apparatuses 23.

The CPU 20 is a processor that governs the overall operational control of the storage apparatus 3. Furthermore, the memory 21 is mainly used to store control programs and control data. A data block migration control program 24, a data block management program 25, a data block management table 26, a volume management table 27, and a page management table 28, which will be described subsequently, are also stored and saved in the memory 21. The various processes by the whole storage apparatus 3 are performed as a result of the CPU 20 executing the control programs stored in the memory 21.

The disk interface 22 interfaces with the memory apparatuses 23, and data and commands are sent and received to and from the memory apparatuses 23 in accordance with the Fibre Channel protocol, for example.

The memory apparatuses 23 are configured from semiconductor memory such as SSD, high-performance and high-cost hard disk drives such as SAS (Serial Attached SCSI) disks, and low-performance and low-cost hard disk drives such as SATA (Serial AT Attachment) disks, for example.

A RAID group is formed from one or more memory apparatuses 23 of the same type (SSD, SAS disks or SATA disks and so on), and storage area provided by a single RAID group is dynamically allocated to the virtual volume in units of a predetermined size known as 'pages.' The relationship between RAID groups, data blocks, and pages and so forth will be described subsequently.

The management server 4 is a computer apparatus comprising information processing resources such as a CPU 30 and a memory 31, and is configured from a personal computer, workstation, mainframe or similar, for example.

The CPU 30 is a processor for controlling the operations of the whole management server 4. Furthermore, the memory 31 is mainly used to store control programs and control data. A data block priority ranking determination program 32, a data block priority ranking management table 33, a data block I/O history table 34, and a data block migration history table 35, which will be described subsequently, are also stored and saved in the memory 31. The various processes by the whole management server 4 are performed as a result of the CPU 30 executing the control programs stored in the memory 31.

Figure 2:
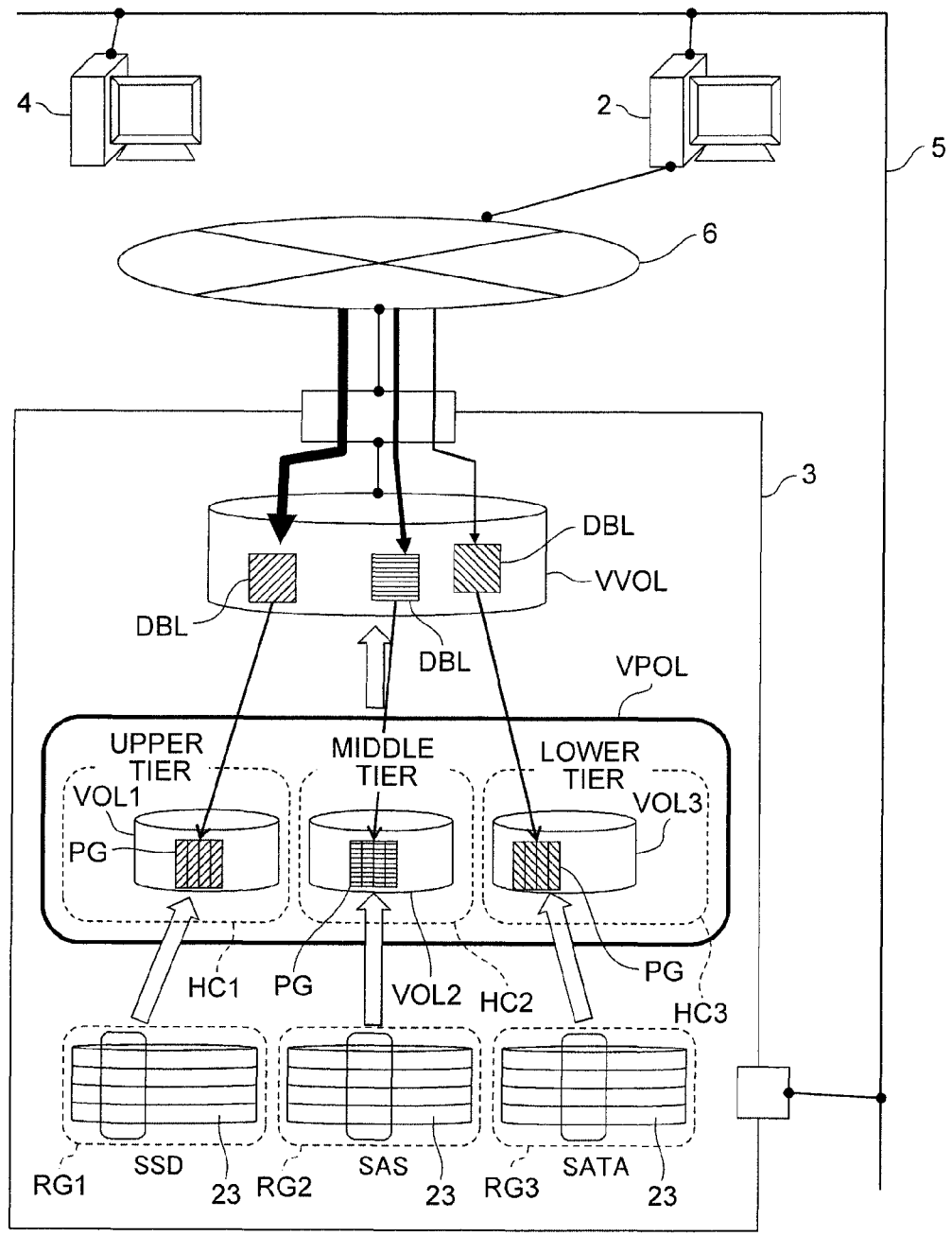
FIG. 2 is a conceptual view explaining a hierarchical data management system according to the first embodiment.

(1-2) Hierarchical data management system according to this Embodiment FIG. 2 shows a logical configuration of the storage apparatus 3. In this storage apparatus 3, RAID groups RG (RG1 to RG3) are formed by one or more memory apparatuses 23 of the same type as mentioned earlier, and one or more volumes VOL (VOL 1 to VOL3) are defined in the storage area provided by each of the memory apparatuses 23 which a single RAID group RG comprises. A storage tier HC (HC1 to HC3) of one type is formed by one or more volumes VOL of the same type (one or more volumes VOL defined in the storage area provided by the memory apparatuses 23 of the same type), and a virtual pool VPOL is formed by storage tiers (HC1 to HC3) of a plurality of types.

In the example in FIG. 2, a first RAID group RG (RG1) is configured from a plurality of SSDs, an SSD volume VOL1 is defined in the storage area provided by the first RAID group RG, and a first storage tier (called the 'SSD tier' hereinbelow) HC1 is formed by one or more SSD volumes VOL1. Furthermore, a second RAID group RG2 is configured from a plurality of SAS hard disk drives, an HDD volume (hereinafter called the 'SAS_HDD volume') VOL 2 is defined in the storage area provided by the second RAID group RG2, and a second storage tier (called the 'SAS_HDD tier' hereinbelow) HC2 is formed by one or more SAS_HDD volumes VOL2. Further, a third RAID group RG3 is configured from a plurality of SATA hard disk drives, an HDD volume (hereinafter called the 'SATA_HDD volume') VOL 3 is defined in the storage area provided by the third RAID group RG3, and a third storage tier (called the 'SATA_HDD tier' hereinbelow) HC3 is formed by one or more SATA_HDD volumes VOL3. In addition, a virtual pool VPOL is formed from the SSD tier HC1, SAS_HDD tier HC2, and SATA_HDD tier HC3.

In this case, among the SSD, SAS hard disk drives, and SATA hard disk drives, the SSD have the highest reliability and response performance, while the SATA hard disk drives have the lowest reliability and response performance. Therefore, among the volumes VOL1 to VOL3 that the virtual pool VPOL comprises, the reliability and response performance of the SSD volume VOL1 are the highest, the reliability and performance of the SAS_HDD volume VOL2 are the next highest, and the reliability and response performance of the SATA_HDD volume VOL3 are the lowest.

Meanwhile, one or more virtual volumes VVOL are created in the storage apparatus 3, and these virtual volumes VVOL are provided to the host apparatus 2. Unique identifiers (hereinafter referred to as 'LUN' (Logical Unit Number)) are assigned to the virtual volumes VVOL. The storage area of a virtual volume VVOL is divided up into blocks (hereinafter called 'data blocks') DBL of a predetermined size, and unique numbers (hereinafter called 'LBA' (Logical Block Addresses)) are assigned to each of the data blocks DBL. The reading and writing of data with respect to the virtual volume VVOL from the host apparatus 2 is performed in data block units obtained by designating addresses which are derived by combining the LUN and LBA.

Each of the virtual volumes VVOL is associated with any one of the virtual pools VPOL defined in the storage apparatus 3. Furthermore, if a request to write data to a virtual volume VVOL is sent to the storage apparatus from the host device 2, when a storage area is allocated to the data blocks in the virtual volume VVOL designated as the data write destination in the write request, a storage area of the required capacity is allocated to the data blocks, from the virtual pool VPOL associated with the virtual volume VVOL, in units of a predetermined size known as 'pages PG.'

Here, the pages PG are basic units of the storage area allocated to the corresponding virtual volume VVOL from the volumes VOL (VOL1 to VOL3) that the virtual pool VPOL comprises. The pages PG are smaller than the data blocks DBL which are the units in which the host device 2 reads/writes data from/to the virtual volume VVOL, and a plurality of pages PG are therefore allocated to one data block DBL. Furthermore, the data from the host apparatus 2 is written to the pages PG allocated to the data blocks DBL in the virtual volume VVOL which is designated as the data write destination, and subsequently the reading/writing of data from/to the data blocks DBL is consequently performed on the pages PG.

Meanwhile, the storage apparatus 3 monitors the number of access inputs/outputs per unit time with respect to each of the data blocks DBL of the virtual volume VVOL, in parallel with the aforementioned allocation of storage area to the virtual volume VVOL. The storage apparatus 3 then executes, at regular or irregular intervals and depending on the average number of access I/O per unit time, hierarchical storage management processing in which an allocation source volume VOL (VOL1 to VOL3) which allocates pages PG to the data blocks DBL of the virtual volume VVOL is changed (re-allocated) where necessary to a volume VOL of another storage tier HC (HC1 to HC3).

Figure 3:
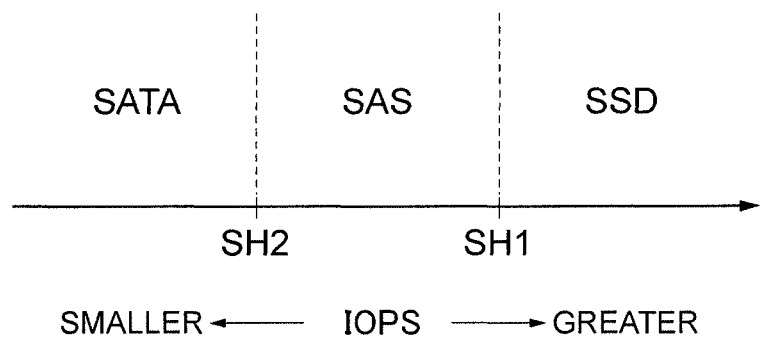
FIG. 3 is a conceptual view explaining hierarchical storage management processing.

More specifically, as shown in FIG. 3, the storage apparatus 3 migrates data between the SSD volume VOL1, the SAS_HDD volume VOL2, and the SATA_HDD volume VOL3 as necessary in order to allocate pages PG from the SSD volume VOL1 of the SSD tier HC1 to data blocks DBL for which the average number of access I/O per unit time exceeds a predetermined first threshold SH1, to allocate pages PG from the SAS_HDD volume VOL2 of the SAS_HDD tier HC2 to data blocks DBL for which the average number of access I/O per unit time is between the first threshold SH1 and greater than a predetermined second threshold SH2 (SH2<SH1), and to allocate pages PG from the SATA_HDD volume VOL3 of the SATA_HDD tier HC3 to data blocks DBL for which the average number of access I/O per unit time does not exceed the second threshold SH2.

Figure 4:
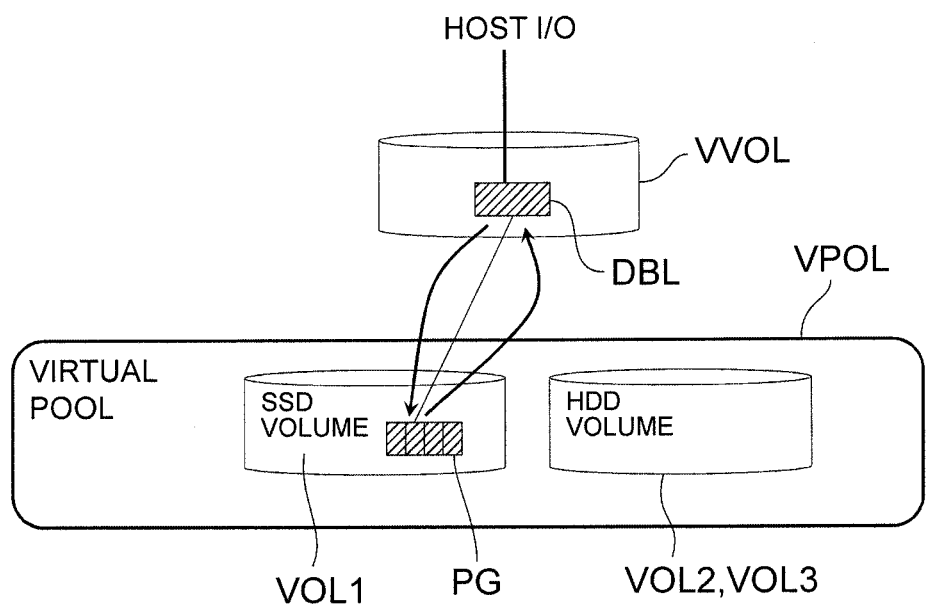
FIG. 4 is a conceptual view explaining a hierarchical data management system according to the first embodiment.
Figure 5:
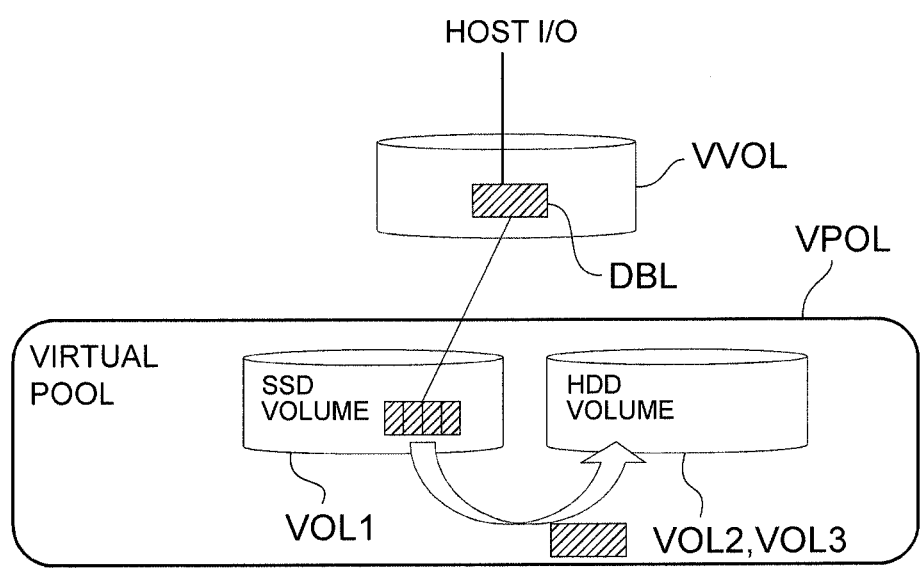
FIG. 5 is a conceptual view explaining a hierarchical data management system according to the first embodiment.

Moreover, in the case of this embodiment, one feature of the storage apparatus 3 is that if the allocation source of the pages PG is switched from the SSD volume VOL 1 to the SAS_HDD volume VOL2 or the SATA_HDD volume VOL3 in the state of allocating the pages PG from the SSD volume VOL1 to the virtual volume VVOL as shown in FIG. 4, the storage apparatus 3 migrates (copies) corresponding data that is stored in the SSD volume VOL1 as shown in FIG. 5 to the corresponding SAS_HDD volume VOL 2 or SATA_HDD volume VOL3 without deleting this data from the SSD volume VOL1.

Figure 6:
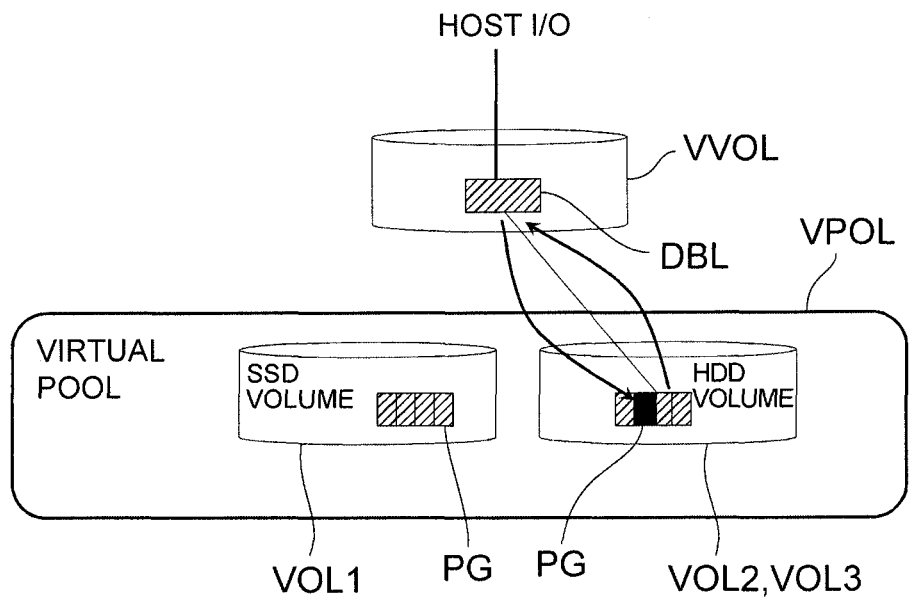
FIG. 6 is a conceptual view explaining a hierarchical data management system according to the first embodiment.

If this data migration is performed from the SSD volume VOL1 to the SAS_HDD volume VOL2 or the SATA_HDD volume VOL3, when there is access from the host device 2 to the corresponding data blocks DBL of the virtual volume VVOL, as shown in FIG. 6 this access is made to the SAS_HDD volume VOL2 or the SATA_HDD volume VOL3 to which the data is migrated, but if at this time data stored in these data blocks DBL is updated, the storage apparatus 3 manages the updated pages PG among the pages PG allocated to the data blocks DBL.

Figure 7:
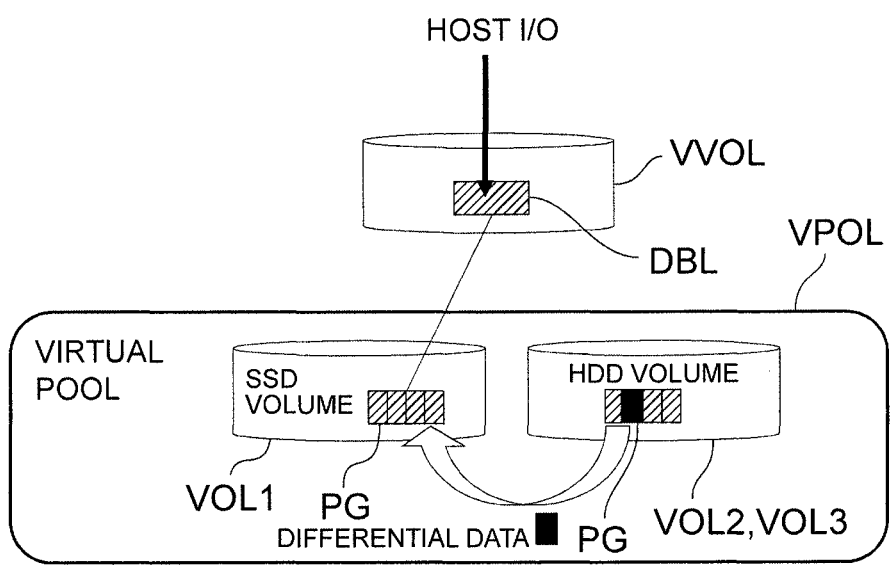
FIG. 7 is a conceptual view explaining a hierarchical data management system according to the first embodiment.

Furthermore, if the average of the number of access I/O per unit time to these data blocks DBL is greater than the first threshold SH1 (FIG. 3) and data of these data blocks DBL is restored (migrated) to the SSD volume VOL1 from the SAS_HDD volume VOL2 or the SATA_HDD volume VOL3, the storage apparatus 3 then, as shown in FIG. 7, overwrites the corresponding part of the pre-migration data in the SSD volume VOL1 (data, referred to hereinafter as 'pre-migration data' which remains in the SSD volume VOL1 after the migration from the SSD volume VOL1 to the SAS_HDD volume VOL2 or SATA_HDD volume VOL3) with only the data of the pages PG which have undergone an update among the data in these data blocks DBL. In addition, the storage apparatus 3 subsequently deletes the data of the data blocks DBL from the migration-source SAS_HDD volume VOL2 or the SATA_HDD volume VOL 3, as shown in FIG. 8.

Figure 8:
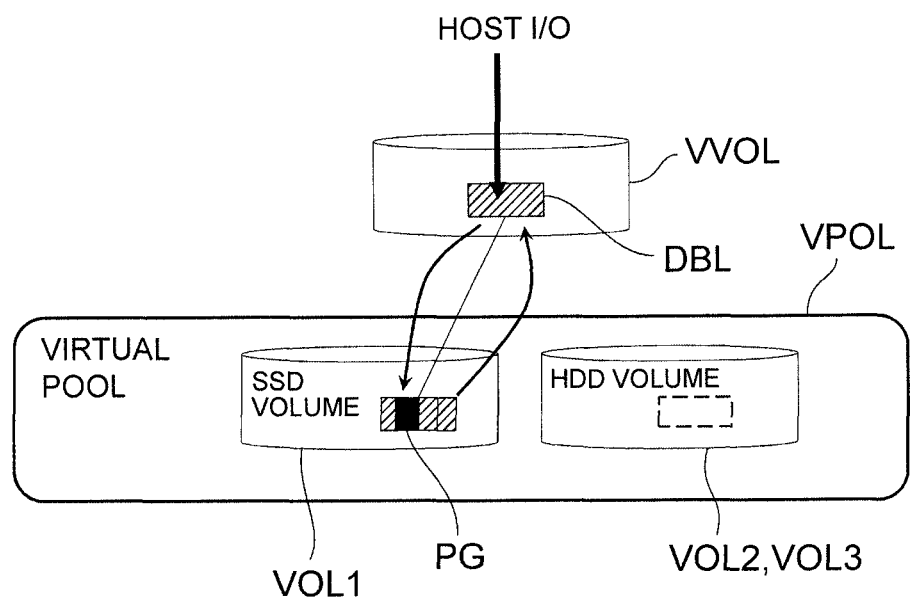
FIG. 8 is a conceptual view explaining a hierarchical data management system according to the first embodiment.

If this data migration is performed from the SAS_HDD volume VOL2 or the SATA_HDD volume VOL3 to the SSD volume VOL1, when there is subsequently access by the host device 2 to the corresponding data blocks DBL of the virtual volume VVOL, as shown in FIG. 8 this access is made to the SSD volume VOL1.

However, with the aforementioned hierarchical data management system of this embodiment, because the pre-migration data of the data migrated from the SSD volume VOL1 to the SAS_HDD volume VOL2 or SATA_HDD volume VOL3 remains indefinitely in the SSD volume VOL1, the capacity of the SSD volume VOL1 will likely be depleted.

Hence, in this embodiment, the management server 4 determines the priority ranking for each of the data blocks DBL in the virtual volume VVOL where the pre-migration data remaining in the SSD volume VOL1 of the storage apparatus 3 is stored, and notifies the storage apparatus 3 of the priority rankings of each of the data blocks DBL, so that if the unused capacity of the SSD volume VOL1 exceeds a predetermined threshold, the storage apparatus 3 deletes the pre-migration data from the SSD volume VOL1 in order starting with the data stored in the lowest-priority ranking data block DBL.

In this case, the management server 4 determines the priority rankings of the data blocks DBL on the basis of the update amount (write access amount) per unit time of data stored in the data blocks DBL and the subsequent migration frequency that is forecast for the data (called the 'forecast migration frequency' hereinbelow) of migration between volumes per unit time.

That is, the greater the amount of write access to the data blocks DBL, the larger the anticipated difference between the pre-migration data remaining in the SSD volume VOL1 and the data migrated to the SAS_HDD volume VOL2 or SATA_HDD volume VOL3. In this case, not only can a large number of pages be expected for the updated part that is migrated from the SAS_HDD volume VOL2 or SATA_HDD volume VOL3 to the SSD volume VOL1, but it is likely to take a long time to migrate the data due to the SSD-specific overwrite operation that involves the temporary deletion and then writing of data.

If there is a small amount of write access to the data blocks DBL, the number of pages restored to the SSD volume VOL1 from the SAS_HDD volume VOL2 or the SATA_HDD volume VOL3 is small and hence the number of pages subjected to a data overwrite in the SSD volume VOL1 can be kept to a minimum and the time taken for the data migration can be shortened.

Moreover, even in cases where data is migrated from the SSD volume VOL1 to the SAS_HDD volume VOL2 or the SATA_HDD volume VOL3 for data blocks DBL for which the forecast data migration frequency is high, data migration in which data is restored to the SSD volume VOL1 from the SAS_HDD volume VOL2 or the SATA_HDD volume VOL3 is highly likely.

In light of the above, in the case of this embodiment, the management server 4 determines the priority rankings of the data blocks in FIG. 9. That is, in this embodiment, the management server 4 determines, among the data blocks DBL in which pre-migration data remains in the SSD volume VOL1, that data blocks DBL have a 'high' priority ranking when the write access amount per unit time with respect to the data stored in the data blocks DBL is no more than a predetermined threshold (hereinafter referred to as the 'write access amount threshold') and when the forecast migration frequency of the data blocks DBL is greater than a predetermined threshold (hereinafter referred to as the 'forecast migration frequency threshold') (data blocks in FIG. 9 for which the write access amount is 'small' and the forecast migration frequency is 'high').

Furthermore, the management server 4 determines that data blocks DBL have a 'medium' priority ranking when the write access amount is no more than the write access amount threshold and the forecast migration frequency is no more than the forecast migration frequency threshold (the data blocks in FIG. 9 which have a 'small' write access amount and a 'small' forecast migration frequency) and when the write access amount is greater than the write access amount threshold and the forecast migration frequency is also greater than the forecast migration frequency threshold (the data blocks in FIG. 9 which have a 'large' write access amount and a 'large' forecast migration frequency). Furthermore, the management server 4 determines that data blocks DBL have a 'low' priority ranking when the write access amount is greater than the write access amount threshold and the forecast migration frequency is no more than the forecast migration frequency threshold (the data blocks in FIG. 9 which have a 'large' write access amount and a 'small' forecast migration frequency).

Furthermore, the management server 4 notifies the storage apparatus 3 of the priority rankings of the corresponding data blocks DBL which are determined as detailed above.

Note that the forecast migration frequency PF can be found using the following equation [Math 1] in which the average time interval, over which data stored in the data blocks DBL is migrated to the SSD from the SAS hard disk drives or SATA hard disk drives is 'A' and the unit time is 'T.'

[Math 1]

$$PF = H(H) \times T/A \quad (1)$$

Here, H(H) is a constant that is determined according to the online status of the host apparatus 2, where the function takes the value of '1' if the host apparatus 2 is online and '0' if offline.

Meanwhile, the storage apparatus 3 continually monitors the used capacity of the SSD volume VOL1, and if the used capacity exceeds a pre-configured threshold for the SSD volume VOL1 (hereinafter called the 'used capacity threshold'), deletes pre-migration data of the data stored in the data blocks DBL remaining in the SSD volume VOL1 from the SSD volume VOL1 in order starting with the data block DBL with the lowest priority ranking (in the order of the data blocks DBL whose priority rankings have been determined as 'low,' 'medium,' and 'high').

As means for implementing the hierarchical data management function according to this embodiment described hereinabove, as shown in FIG. 1 the memory 21 of the storage apparatus 3 stores the data block migration control program 24, the data block management program 25, the data block management table 26, the volume management table 27, and the page management table 28; and the memory 31 of the management server 4 stores the data block priority ranking determination program 32, the data block priority ranking management table 33, the data block I/O history table 34, and the data block migration history table 35.

Of the aforementioned tables and programs, the data block migration control program 24 controls data migration between the volumes VOL. Furthermore, the data block management program 25 performs control that includes migrating data, which is stored in the data blocks DBL according to the number of access I/O per unit time with respect to each of the data blocks DBL in the virtual volume VVOL, to the volumes VOL of the other storage tiers HC, as required. The CPU 20 (FIG. 1) of the storage apparatus 3 executes data migration processing between the volumes by controlling the corresponding memory apparatuses 23 via the disk interface 22 (FIG. 1) on the basis of the data block migration control program 24. In addition, the CPU 20 executes write processing, data migration control processing, and processing relating to the SSD volume unused area, which will be described subsequently, on the basis of the data block management program 25.

The data block management table 26 is used to manage information and so forth relating to the migration of data and storage points for data that is stored in each of the data blocks DBL of each virtual volume VVOL and, as shown in FIG. 10, the data block management table 26 comprises a data block ID field 26A, a data block storage point information field 26B, a pre-migration data block storage point information field 26C, a migration date and time field 26D, and a priority ranking field 26E.

Furthermore, the data block ID field 26A stores identifiers (data block IDs) for each of the data blocks DBL of the virtual volumes VVOLs, and the data block storage point information field 26B stores address information (LUNs and LBAs) which indicates the actual storage point for data that is written to the corresponding data blocks DBL.

The pre-migration data block storage point information field 26C stores address information (LUNs and LBAs) indicating the storage points of pre-migration data in the data in the SSD volume VOL1 if the data of the corresponding data blocks DBL is migrated from the SSD volume VOL1 to the SAS_HDD volume VOL2 or the SATA_HDD volume VOL3.

The migration date and time field 26D stores the date and time when the data were first migrated if the data of the corresponding data blocks DBL is migrated from the SSD volume VOL1 to the SAS_HDD volume VOL2 or the SATA_HDD volume VOL3, and the priority ranking field 26E stores the priority rankings of the data blocks DBL notified by the management server 4.

Hence, in the example of FIG. 10, for the data block DBL 'DataBlock#1-2', for example, the current priority ranking is 'medium,' data migration is performed to the SAS_HDD volume VOL2 or SATA_HDD volume VOL3, namely the current 'HDDVolume#1' from the SSD volume VOL1 labeled 'SSDVolume#1' at 'Dec. 1, 2009 19:00,' and pre-migration data remains at point 'SSDVolume#1'.

In addition, the volume management table 27 is used to manage each of the volumes (SSD volume VOL1, SAS_HDD volume VOL2, and SATA_HDD volume VOL3) which are defined in the storage apparatus 3 and, as shown in FIG. 11, comprises a volume ID field 27A, a capacity field 27B, a used capacity field 27C, and a used capacity threshold field 27D.

Furthermore, the volume ID field 27A stores the identifiers (LUNs) of each of the volumes VOL that are defined in the storage apparatus 3, and the capacity field 27B stores the capacities of the corresponding volumes VOL. The used capacity field 27C stores the current used capacity of a volume VOL and the used capacity threshold field 27D stores a used capacity threshold that is preset for the volume VOL.

Therefore, in the example of FIG. 11, the volume VOL labeled 'SSDVolume#1' is shown with a capacity of '700 GB,' a current used capacity of '350 GB,' and a used capacity threshold of '80%.'

In addition, the page management table 28 is used to perform management to determine whether or not, for each of data blocks DBL to which pages PG are allocated among the data blocks DBL of each virtual volume VVOL defined in the storage apparatus 3, data that is written to the pages PG allocated to these data blocks DBL has been updated and, as shown in FIG. 12, comprises a data block ID field 28A, a page ID field 28B, and an update field 28C.

Furthermore, the data block ID field 28A stores identifiers (data block IDs) for data blocks DBL to which the pages PG in each of the virtual volumes VVOL have been allocated, and the page ID field 28B stores identifiers (page IDs) for each of the pages PG allocated from the virtual pool VPOL to the corresponding data blocks DBL. The update field 28C stores flags indicating whether the corresponding page PG has been updated ('0' when not updated and '1' when updated).

Therefore, in the example of FIG. 12, it can be seen that pages PG labeled 'Page#1-3-1', 'Page#1-3-2,' and so forth have been allocated to the data block DBL 'DataBlock#1-3,' and of these pages, data stored on page PG 'Page#1-3-2' has been updated.

Meanwhile, the data block priority ranking determination program 32 determines the priority ranking in each case of each of the data blocks DBL in each virtual volume VVOL defined in the storage apparatus 3 as mentioned earlier. The CPU 30 (FIG. 1) of the management server 4 determines the respective priority rankings of each of the data blocks DBL in accordance with the data block priority ranking determination program 32 and notifies the storage apparatus 3 of the determination result.

Furthermore, the data block priority ranking management table 33 is used to manage the priority rankings of each of the data blocks DBL determined by the data block priority ranking determination program 32 and, as shown in FIG. 13, comprises a host ID field 33A, an online status field 33B, a virtual volume ID field 33C, a data block ID field 33D, and a priority ranking field 33E.

In addition, the host ID field 33A stores identifiers (host IDs) which are assigned to each of the host apparatuses 2 in the computer system 1, and the virtual volume ID field 33C stores identifiers (LUN) of each of the virtual volumes VVOL to which the corresponding host apparatuses 2 are granted access.

Furthermore, the data block ID field 33D stores the identifiers (data block IDs) of each of the data blocks DBL of the corresponding virtual volumes VVOL, and the priority ranking field 33E stores the priority rankings of the corresponding data blocks DBL determined by the data block priority ranking determination program 32. In the case of this embodiment, the priority rankings of the data blocks DBL are, as described earlier in FIG. 8, divided into three levels, namely 'high,' 'medium,' and 'low' in order of descending priority.

The online status field 33B stores the online statuses of the host apparatuses 2 corresponding to the corresponding virtual volumes VVOL (which is 'online' when the host apparatus is online and 'offline' when offline). This information is collected from each of the host apparatuses 2 via the management LAN 5 (FIG. 1) by means of the data block priority ranking determination program 32.

Hence, in the example of FIG. 13, it can be seen that the host apparatus 2 labeled 'Host#1,' for example, is granted access to the virtual volumes VVOL labeled 'Volume#1,' 'Volume#2,' . . . , the online status for these virtual volumes VVOL is 'online,' the priority ranking for the data block DBL 'DataBlock#1-1' of the virtual volume VVOL labeled 'Volume#1' has been determined to be 'high,' the priority ranking of the data block DBL 'DataBlock#1-2' has been determined to be 'medium,' and the priority ranking of the data block DBL labeled 'DataBlock#1-3' has been determined to be 'low.'

In addition, the data block I/O history table 34 manages the history of accesses by the host apparatuses 2 to each of data blocks DBL of each virtual volume VVOL in the storage apparatus 3 and, as shown in FIG. 14, comprises a data block ID field 34A, a write access amount field 34B, and a date and time field 34C.

The data block ID field 34A stores identifiers (data block IDs) of each of the data blocks DBL in the storage apparatus 3, and the date and time field 34C and the write access amount field 34B store the date and time and the write access amount at this date and time respectively for the corresponding data blocks DBL.

Hence, in the example of FIG. 14, it can be seen that, for the data block DBL 'DataBlock#1-2,' for example, write access takes place at 'Dec. 1, 2009 18:00,' 'Dec. 1, 2009 19:00,' and 'Dec. 1, 2009 20:00,' . . . and that the access amounts (written data amounts) at these times are '1355 KB,' '2300 KB,' and '1420 KB,' . . . respectively.

The data block migration history table 35 manages the history of data migrations for each of the data blocks DBL in each virtual volume VVOL in the storage apparatus 3 and, as shown in FIG. 15, comprises a data block ID field 35A, a migration-source volume field 35B, a migration destination volume field 35C, and a migration date and time field 35D.

Furthermore, the data block ID field 35A stores identifiers (data block IDs) for data blocks DBL, among each of the data blocks DBL in each virtual volume VVOL in the storage apparatus 3, to which the pages PG have been allocated from the virtual pool VPOL; and the migration-source volume field 35B and migration-destination volume field 35C store each of the identifiers (LUN) of the migration-source volume VOL and migration-destination volume VOL respectively when data in the corresponding data blocks DBL is migrated. Moreover, the migration date and time field 35D stores the date and time that the corresponding data migration was performed.

Therefore, in the case of the example of FIG. 15, it can be seen that, for the data block DBL 'DataBlock#1-2,' for example, data migration is carried out from a volume VOL labeled 'HDDVolume#3' to a volume VOL called 'SSDVolume#1' at 'Dec. 1, 2009 00:00, ' and subsequently data migration (relocation) is performed from the volume VOL labeled 'SSDVolume#1' to the volume VOL labeled 'HDDVolume#1' at 'Dec. 1, 2009 19:00.'

Note that each of the information items stored in the data block I/O history table 34 and the data block migration history table 35 are collected as a result of the data block priority ranking determination program 32 accessing the storage apparatus 3 at regular intervals via the management LAN (FIG. 1).

(1-3) Various processing relating to the hierarchical data management function according to this embodiment. The specific details of the various processing relating to the hierarchical data management function according to this embodiment will be described next. It goes without saying that, although the various processing will be described below with the focus on the 'programs', in reality it is the CPU 20 of the storage apparatus 3 (FIG. 1) or the CPU 30 of the management server 4 that executes this processing.

(1-3-1) Write Processing

Figure 16:
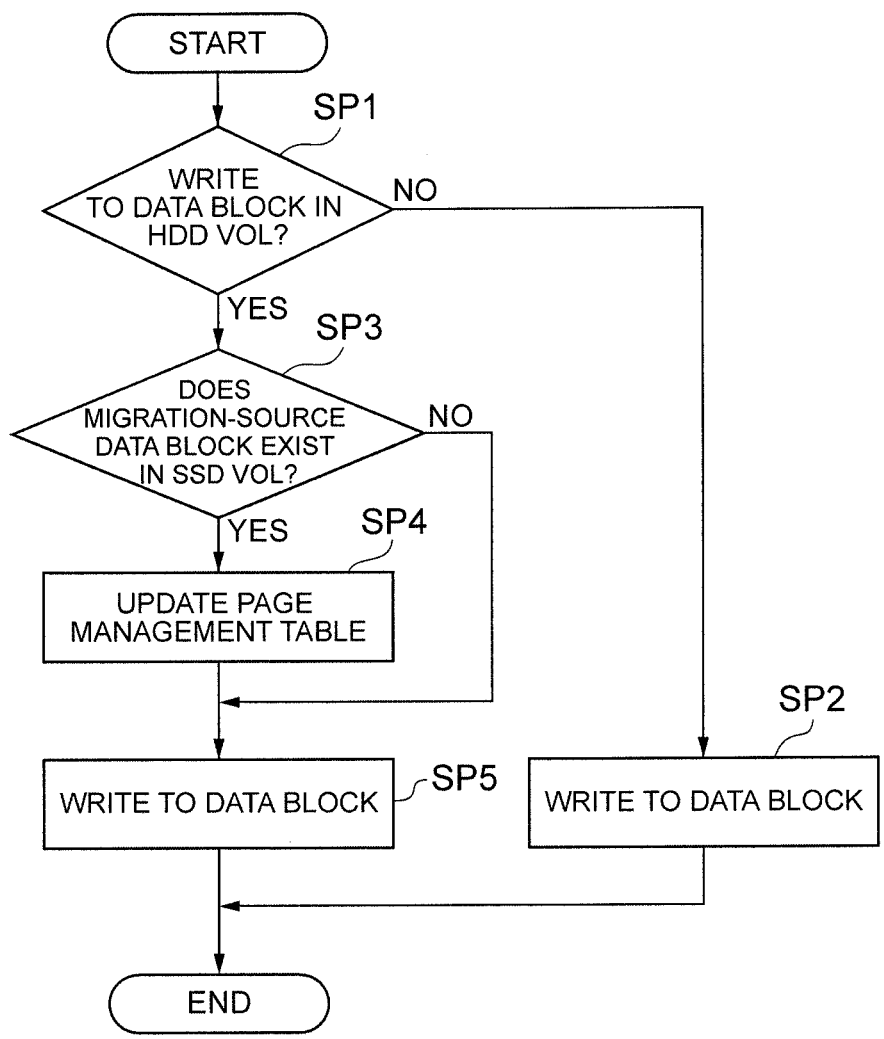
FIG. 16 is a flowchart illustrating a processing routine for write processing.

FIG. 16 shows a processing routine for write processing that is executed by the data block management program 25 when a write request to write to the virtual volume VVOL is received from the host apparatus 2.

The data block management program 25 starts the write access processing when the write request is issued by the host apparatus 2, and first determines whether or not the data write destination designated in the write request is a data block DBL that has been allocated a page PG from the SAS_HDD volume VOL2 or the SATA_HDD volume VOL3 in the virtual volume VVOL (SP1).

When a negative result is obtained in this determination, this means that a page PG has not yet been allocated from the corresponding virtual pool VPOL to the data block DBL in the virtual volume VVOL designated in the write request as the data write destination, or means that a page PG has already been allocated from the SSD volume VOL1 to the data block DBL in the virtual volume VVOL designated in the write request as the data write destination.

Thus, if a page PG has not been allocated to the data block DBL in the virtual volume VVOL designated in the write request, the data block management program 25 allocates a page PG from the SSD volume VOL1 to the data block DBL and then writes the write target data to this page PG (SP2). Furthermore, if a page PG has already been allocated from the SSD volume VOL1 to the data block DBL in the virtual volume VVOL designated in the write request as the data write destination, the data block management program 25 then writes the write target data to the SSD volume VOL1 (SP2). The data block management program 25 then terminates the write processing.

When, on the other hand, an affirmative result is obtained in the determination of step SP1, this means that a page PG has already been allocated from the SAS_HDD volume VOL2 or the SATA_HDD volume VOL3 to the data block DBL in the virtual volume VVOL designated in the write request as the data write destination.

The data block management program 25 therefore then refers to the data block management table 26 to determine whether or not, among the data stored on page PG that has migrated from the SSD volume VOL1, pre-migration data still remains in the SSD volume VOL1 (SP3).

Furthermore, when a negative result is obtained in this judgment, the data block management program 25 advances to step SP5, whereas when an affirmative result is obtained, the data block management program 25 changes the flag in the update field 28C (FIG. 12) corresponding to each page PG to which the write target data is written in the page management table 28 to '1', which signifies that an update has been performed (SP4).

Thereafter, the data block management program 25 stores the write target data on the page PG allocated from the SAS_HDD volume VOL2 or the SATA_HDD volume VOL3 to the data block DBL in the virtual volume VVOL designated in the write request (SP5) and then terminates the write processing.

(1-3-2) Data Block Migration Control Processing

Figure 17:
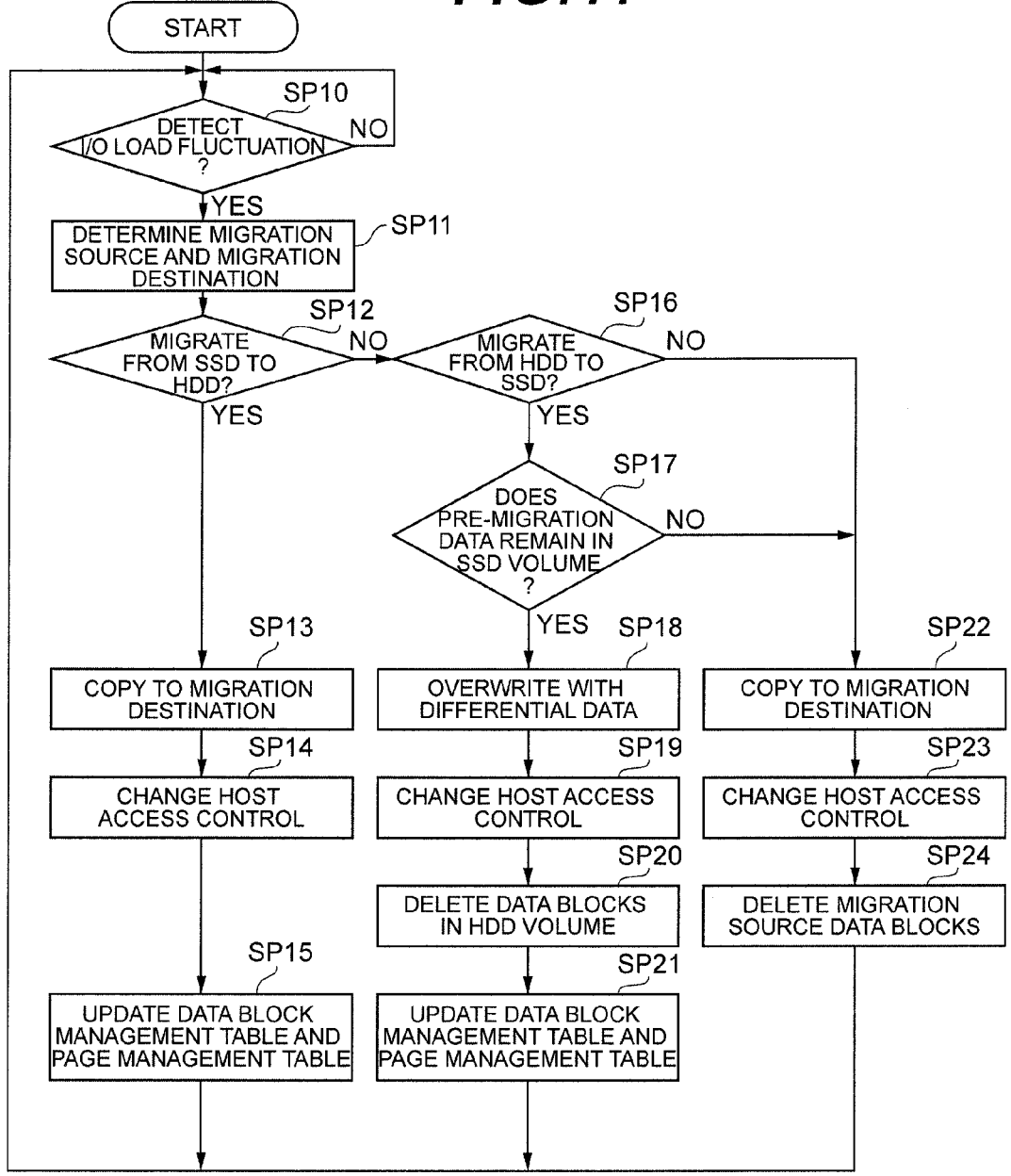
FIG. 17 is a flowchart illustrating a processing routine for data block migration control processing.

FIG. 17 shows a processing routine for data block migration control processing that is executed by the data block management program 25. The data block management program 25 migrates data, written in the data blocks DBL in the virtual volume VVOL, to the volumes VOL of the other storage tiers HC, as required, in accordance with the processing routine shown in FIG. 17.

That is, the data block management program 25 continually monitors the number of access I/O per unit time with respect to each of the data blocks DBL which have been allocated a page PG from the corresponding virtual pool VPOL, among the data blocks DBL in each virtual volume VVOL provided to the host apparatus 2 (SP10).

When the data block management program 25 detects that the average of the number of access I/O per unit time with respect to any of the data blocks DBL changes and the data destination must be switched to a volume VOL of another storage tier HC (the data of the data blocks DBL must be migrated to the volume VOL of another storage tier HC), the data block management program 25 then determines each of the migration-source and migration-destination volumes VOL for the data of the data blocks DBL (SP11).

In reality, the data block management program 25 first searches the data block management table 26 for the current storage point of the data in the data blocks DBL which have exhibited the aforementioned change in the average number of access I/O per unit time. Furthermore, the data block management program 25 determines the volume VOL which is the data migration destination for the data blocks DBL on the basis of the aforementioned rule in FIG. 3 and the used capacity and used capacity threshold for each volume which is a migration destination candidate registered in the volume management table 27. At this time, if there are a plurality of volumes VOL with a priority ranking qualifying them as the migration destination, the data block management program 25 selects the volume VOL with the smallest access I/O number average from the volumes VOL. However, the migration-destination volume VOL may also be selected by means of a different method from that described above from a plurality of volumes VOL with the same priority ranking.

Thereafter, the data block management program 25 determines, based on the determination result in step SP11, whether or not the migration of the data of these data blocks DBL is to be from the SSD volume VOL1 to the SAS_HDD volume VOL2 or the SATA_HDD volume VOL3 (SP12).

When an affirmative result is obtained in this determination, the data block management program 25 starts up the data block migration control program 24 (FIG. 1). Thus, by controlling the corresponding memory apparatuses 23 (FIG. 1) via the disk interface 22 (FIG. 1), the data block migration control program 24 migrates the data of the data blocks DBL from the migration-source volume VOL (SSD volume VOL1) determined in step SP11 to the migration-destination volume VOL (SAS_HDD volume VOL2 or the SATA_HDD volume VOL3) (SP13).

In addition, by changing the information stored in the corresponding data block storage point information field 26B in the data block management table 26 to the actual migration destination address of the data, the data block management program 25 changes, from that point forward, the reference point in the event of access to the data blocks DBL by the host apparatus 2 (SP15), and updates the data block management table 26 and the page management table 28 to reflect the processing of steps SP13 and SP14 (SP15). The data block management program 25 then returns to step SP10.

However, when a negative result is obtained in the determination of step SP12, the data block management program 25 determines whether or not the migration of the data of these data blocks DBL is to be made to the SSD volume VOL1 from the SAS_HDD volume VOL2 or the SATA_HDD volume VOL3 (SP16).

When an affirmative result is obtained in this determination, the data block management program 25 refers to the data block management table 26 to determine whether or not this data has been migrated from the SSD volume VOL1 to the SAS_HDD volume VOL2 or the SATA_HDD volume VOL3 and whether pre-migration data remains in the SSD volume VOL1 (SP17).

When a negative result is obtained in this determination, the data block management program 25 advances to step SP22. When, on the other hand, an affirmative result is obtained in the determination of step SP16, the data block management program 25 refers to the page management table 28 and detects, in the data blocks DBL in the SAS_HDD volume VOL2 or SATA_HDD volume VOL3 where this data is stored, pages PG on which data has been updated after being migrated from the SSD volume VOL1 to the SAS_HDD volume VOL2 or SATA_HDD volume VOL3 (pages for which the flag stored in the update field 28C of the page management table 28 (FIG. 12) is '1'). The data block management program 25 then starts up the data block migration control program 24. Thus, by controlling the corresponding memory apparatuses 23 (FIG. 1) via the disk interface 22 (FIG. 1), the data block migration control program 24 overwrites the corresponding pages PG in the SSD volume VOL1 by copying only the data of the aforementioned pages PG (containing updated data after migration) to these corresponding pages PG (SP18).

Thereafter, by changing the information stored in the corresponding data block storage point information field 26B in the data block management table 26 to the actual migration-destination address of the data, the data block management program 25 changes, from that point forward, the reference point in the event of access to the data blocks DBL by the host apparatus 2 (SP19), and by controlling the corresponding memory apparatuses 23 via the disk interface 22, deletes the data from the SAS_HDD volume VOL2 or SATA_HDD volume VOL3 which was the source of the data (SP20).

The data block management program 25 also updates the data block management table 26 and the page management table 28 (SP21) to reflect the processing of steps SP19 and SP20 and then returns to step SP10.

Meanwhile, when a negative result is obtained in the determination of step SP16, the data block management program 25 starts up the data block migration control program 24. Thus, by controlling the corresponding memory apparatuses 23 (FIG. 1) via the disk interface 22, the data block migration control program 24 migrates the data of the data blocks DBL from the migration-source volume VOL (SAS_HDD volume VOL2 or SATA_HDD volume VOL3) determined in step SP11 to the migration-destination volume VOL (SAS_HDD volume VOL2 or SATA_HDD volume VOL3) (SP22).

Thereafter, by changing the information stored in the corresponding data block storage point information field 26B in the data block management table 26 to the actual migration destination address of the data, the data block management program 25 changes, from that point forward, the reference point in the event of access to the data blocks DBL by the host apparatus 2 (SP23). Furthermore, by controlling the corresponding memory apparatuses 23 via the disk interface 22, the data block management program 25 deletes the data from the SAS_HDD volume VOL2 or SATA_HDD volume VOL3 (SP24) which is the migration source of the data, and then returns to step SP10.

(1-3-3) SSD Volume Unused Capacity Monitoring Processing

Figure 18:
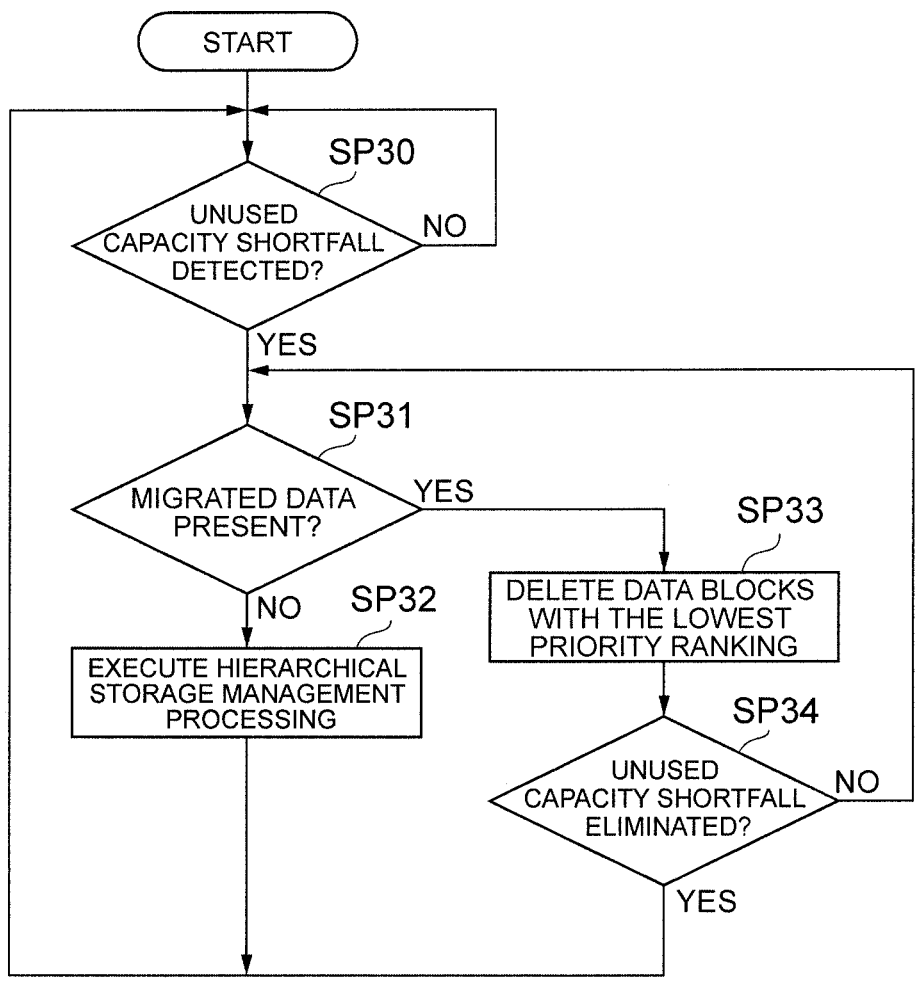
FIG. 18 is a flowchart illustrating a processing routine for SSD volume unused area monitoring processing.

FIG. 18 shows a processing routine for SSD volume unused capacity monitoring processing that is executed by the data block management program 25. The data block management program 25 monitors the unused capacity of the SSD volume VOL1 in accordance with the processing routine shown in FIG. 18 and where necessary deletes data in the pre-migration data which is of a low priority ranking and remains on the SSD volume VOL1, from the SSD volume VOL1.

That is, the data block management program 25 continually monitors unused capacity of the SSD volume VOL3 in the storage apparatus 3 (SP30). When before long the data block management program 25 detects that the unused capacity of the SSD volume VOL1 exceeds the used capacity threshold of the SSD volume VOL1 specified in the volume management table 27, the data block management table 25 refers to the data block management table 26 to determine whether or not there is pre-migration data that remains in the SSD volume VOL1 which has been migrated from the SSD volume VOL1 to the SAS_HDD volume VOL2 or SATA_HDD volume VOL3 (SP31).

When a negative result is obtained in this determination, the data block management program 25 executes the processing of step SP11 and subsequent steps in FIG. 17. In so doing, the data block management program 25 repeats the processing of step SP11 and subsequent steps in FIG. 17 until the unused capacity shortfall of the SSD volume VOL1 in which the unused capacity shortfall was detected in SP30 is eliminated. The data block management program 25 also updates the data block management table 26, the volume management table 27 and the page management table 28 in accordance with the hierarchical storage management processing (SP32). The data block management program 25 then returns to step SP30.

When, on the other hand, an affirmative result is obtained in the determination of step SP31, by controlling the corresponding memory apparatuses 23 via the disk interface 22, the data block management program 25 deletes, from the SSD volume VOL1, the data of the data blocks DBL with the lowest priority ranking that is notified by the management server 4 among the data still remaining in the SSD volume VOL1 that has been migrated to the SAS_HDD volume VOL2 or the SATA_HDD volume VOL3 from the SSD volume VOL1 in which an unused capacity shortfall was detected in step SP30. The data block management program 25 also accordingly updates the data block management table 26 and the volume management table 27 (SP33).

Thereafter, the data block management program 25 determines that the unused capacity shortfall of the SSD volume VOL1 in which the unused capacity shortfall was detected in SP30 has been eliminated (SP34). When a negative result is obtained in this determination, the data block management program 25 returns to step SP31 and then repeats the processing of steps SP31 to SP34.

Furthermore, when before long an affirmative result is obtained in step SP34 as a result of eliminating the unused capacity shortfall of the SSD volume VOL1 in which the unused capacity shortfall was detected in SP30, the data block management program 25 returns to step SP30 and then repeats the same processing.

(1-3-4) Data Block Priority Ranking Determination Processing

Figure 19:
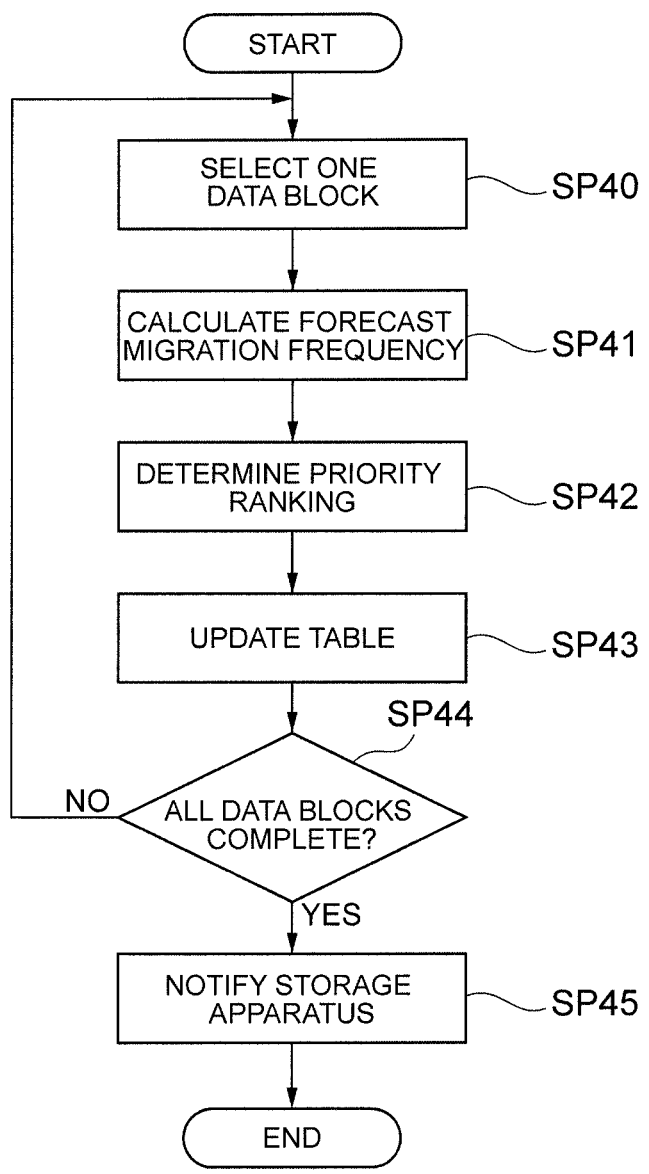
FIG. 19 is a flowchart illustrating a processing routine for data block priority ranking determination processing according to the first embodiment.

Meanwhile, FIG. 19 shows a processing routine for data block priority ranking determination processing that is executed by the data block priority ranking determination program 32 of the management server. The data block priority ranking determination program 32 determines the priority ranking of each of the data blocks DBL in the virtual volume VVOL in accordance with the processing routine shown in FIG. 19, and notifies the storage apparatus 3.

That is, the data block priority ranking determination program 32 starts the data block priority ranking determination processing at regular intervals and first selects one unprocessed data block DBL from among the data blocks DBL registered in the data block priority ranking management table 33 (FIG. 13) (SP40).

Thereafter, the data block priority ranking determination program 32 refers to the data block migration history table 35 (FIG. 15) to calculate the forecast migration frequency for the data block DBL selected in step SP40 by using Equation (1) shown earlier (SP41).

The data block priority ranking determination program 32 then determines the priority ranking of the data block DBL in accordance with the priority ranking determination rule mentioned earlier with reference to FIG. 9, on the basis of the calculation result in step SP41 and the write access amount per unit time with respect to the corresponding data block DBL identified on the basis of the data block I/O history table 34 (FIG. 14) (SP42).

Furthermore, the data block priority ranking determination program 32 updates the priority ranking field 33E (FIG. 13) of the corresponding entry in the data block priority ranking management table 33 on the basis of the determination result in step SP42 (SP43) and then determines whether or not the same processing is complete for all the data blocks DBL registered in the data block priority ranking management table 33 (SP44).

When a negative result is obtained in this determination, the data block priority ranking determination program 32 returns to step SP40 and then repeats the processing of steps SP40 to SP44. Furthermore, when before long an affirmative result is obtained in step SP44 as a result of completing the same processing for all the data blocks DBL registered in the data block priority ranking management table 33, the data block priority ranking determination program 32 transmits the latest priority rankings of each of the data blocks DBL registered in the data block priority ranking management table 33 to the storage apparatus 3 together with a command to update the data block management table 26 (FIG. 10) (SP45).

When the data block management program 25 (FIG. 1) of the storage apparatus 3 accordingly receives this update command, the data block management program 25 updates the priority rankings of each of the data blocks DBL registered in the data block management table 26 as necessary, based on the latest priority rankings of each of the data blocks DB transmitted from the management server 4 together with the update command.

The data block priority ranking determination program 32 then terminates the data block priority ranking determination processing.

(1-4) Effect of the Embodiment

According to the computer system 1 of this embodiment, the volume of data that is rewritten in the SSD volume VOL1 when data is restored to the SSD volume VOL1 from the SAS_HDD volume VOL2 or SATA_HDD volume VOL3 in the storage apparatus 3 can be kept to the required minimum.

It is therefore possible to prevent the original rewriting of the SSD volume VOL1 from also extending to unnecessary data parts, and to effectively prevent a deterioration of the SSD due to the frequent rewriting of data. The effective usage of the storage apparatuses 23 can accordingly be promoted while minimizing maintenance costs and work due to this shortening of the SSD's lifespan.

(2) Second Embodiment (2-1) Method of Determining Data Block Priority Rankings According to the Second Embodiment In the computer system 1 according to the first embodiment, when restoring data to the SSD volume VOL1 from the SAS_HDD volume VOL2 or SATA_HDD volume VOL3, the greater the number of data blocks DBL with a large total number of pre-migration pages that can be re-used without being overwritten, the greater the effect of promoting the effective usage of the memory apparatuses 23 and so on while suppressing the maintenance costs and work caused by a shortening of the SSD's life.

Hence, in the data migration to the SSD volume VOL1 from the SAS_HDD volume VOL2 or SATA_HDD volume VOL3 generated in a certain fixed period, a higher priority ranking is configured for data blocks DBL with a large total number of pre-migration pages that can be re-used without being overwritten, the intention being to leave this data in the SSD volume VOL1.

In other words, the priority ranking P of the data blocks DBL can be expressed as per the following equation, in which the average of the number of pages that can be reused in a single migration is ANP, and the forecast migration frequency is PF.

[Math 2]

$$P \propto ANP \times PF \qquad (2)$$

Here, the average ANP of the number of pages that can be reused in a single migration is given by the following equation [Math 3], in which the number of pages of the data blocks DBL is 'NPD;' the average of the number of updated pages due to write access generated in the SAS_HDD volume VOL2 or SATA_HDD volume VOL3 is 'AN;' the data size of the data block DBL is 'DSD;' the average updated data size due to write access generated in the SAS_HDD volume VOL2 or SATA_HDD volume VOL3 is 'ADS,' and the page size is 'DSP.'

[Math 3]

$$\begin{aligned} ANP &= NPD - AN \\ &= (DSD - ADS)/DSP \end{aligned} \qquad (3)$$

Furthermore, the updated data size ADS due to write access generated in the SAS_HDD volume VOL2 or SATA_HDD volume VOL3 is considered to be in proportion to the product of the write access amount W per unit time and the residual time B of the data in the SAS_HDD volume VOL2 and SATA_HDD volume VOL3, and therefore the average ANP of the number of pages that can be re-used in a single migration is given by the following equation, in which C and C' are constants.

[Math 4]

$$ANP = (DSD - C \times W \times B)/DSP \propto DSD \times C' - W \times B \qquad (4)$$

In practice, if we consider a case with a negative number, the average ANP of the number of pages that can be re-used in a single migration can be expressed as per the following equation. Note that if there is a negative number in the brackets [ ] in the following equation, this value is taken to be zero.

[Math 5]

$$ANP = [DSD \times C' - W \times B] \qquad (5)$$

In Equation (5), 'DSD×C'' is a constant and can be regarded as a threshold. Hence, if 'C'=1,' Equation (5) signifies that 'the priority ranking is '0' in a case where write access equal to or greater than the block size of the data blocks is anticipated for data blocks in the HDD volume VOL2 or SATA_HDD volume VOL3.'

However, the forecast migration frequency PF for data migration to the SSD volume VOL1 from the SAS_HDD volume VOL2 or SATA_HDD volume VOL3 within a fixed period can be expressed as per Equation (1).

The priority rankings P of the data blocks DBL can be expressed as per the following equations (1), (2), and (5).

[Math 6]

$$P \propto [D \times C' - W \times B] \, H(H) \times T/A \qquad (6)$$

Note that in Equation (6), T is a constant and therefore the priority ranking P of the data blocks DBL can be expressed by the following equation.

[Math 7]

$$P \propto [D \times C' - W \times B] H(H)/A \qquad (7)$$

The high or low priority ranking P for each of the data blocks DBL can be determined by calculating the priority ranking of the individual data blocks DBL using the following equation

[Math 8]

$$P = [D \times C' - W \times B] H(H)/A \qquad (8)$$

and comparing the calculation result.

Note that in Equation (8), the value of 'D×C'' is configured as the threshold as mentioned earlier. Furthermore, in Equation (8), the write access amount W per unit time can be found from the data block I/O history table 34 (FIG. 14) and the residual time B that the data is in the SAS_HDD volume VOL2 or SATA_HDD volume VOL3 can be found from the data block migration history table 35 (FIG. 15). In addition, the average time interval A for migrating data stored in the data blocks DBL to an SSD from a SAS hard disk drive or SATA hard disk drive can be determined from the data block migration history table 35, and the value of the function H (H) can be determined by referring to the online status field 33E (FIG. 13) of the data block priority ranking management table 33 (FIG. 13).

Figure 20:
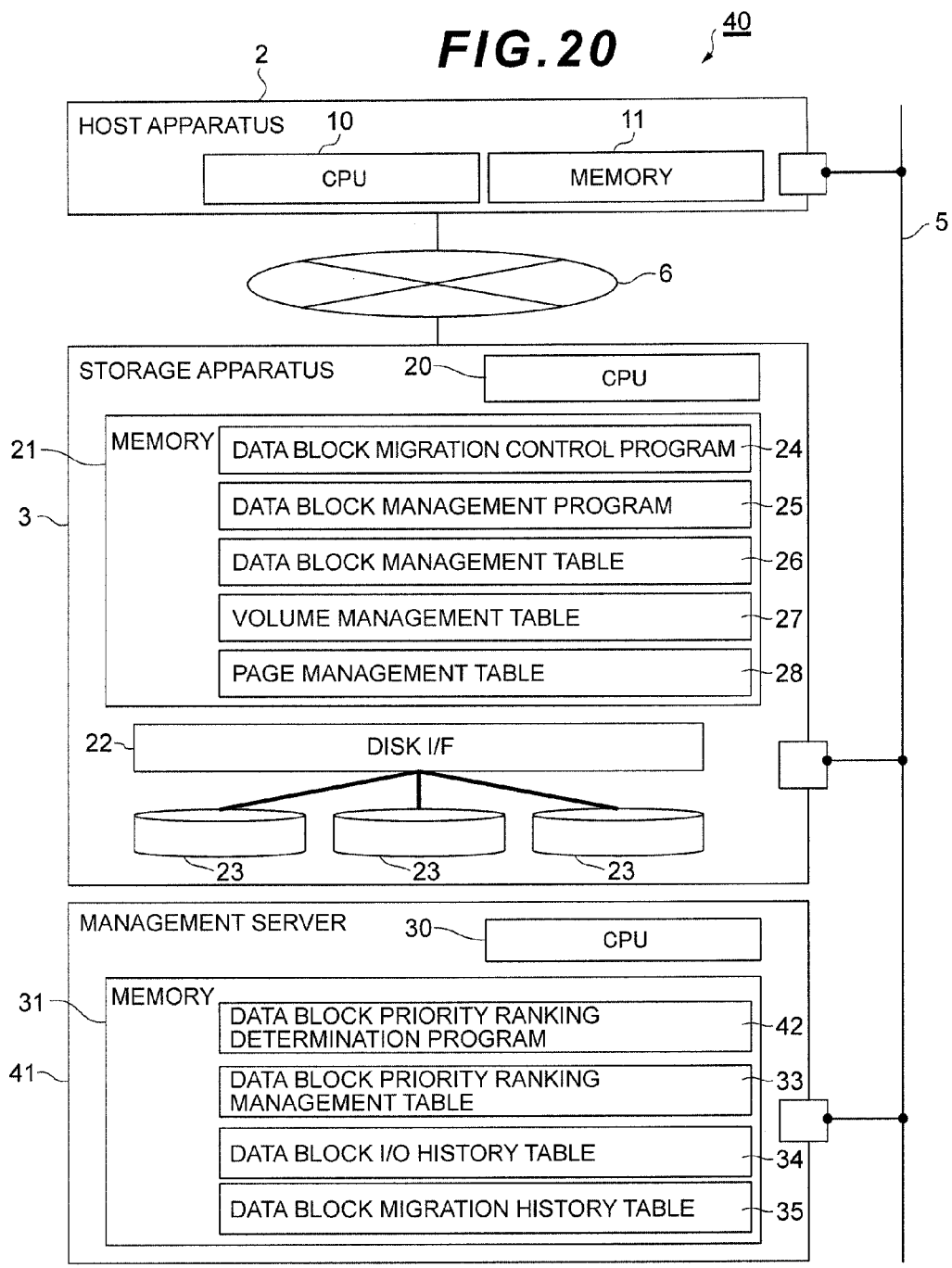
FIG. 20 is a block diagram showing the whole configuration of a computer system according to a second embodiment.

(2-2) Data Block Priority Ranking Determination Processing According to the Second Embodiment FIG. 20, in which the same reference signs are assigned to parts corresponding to parts in FIG. 1, shows a computer system 40 according to the second embodiment. This computer system 40 is configured in the same way as the computer system 1 (FIG. 1) according to the first embodiment except for the different method of determining the priority rankings of each of the data blocks that is executed by the data block priority ranking determination program 42 of the management server 41.

Figure 21:
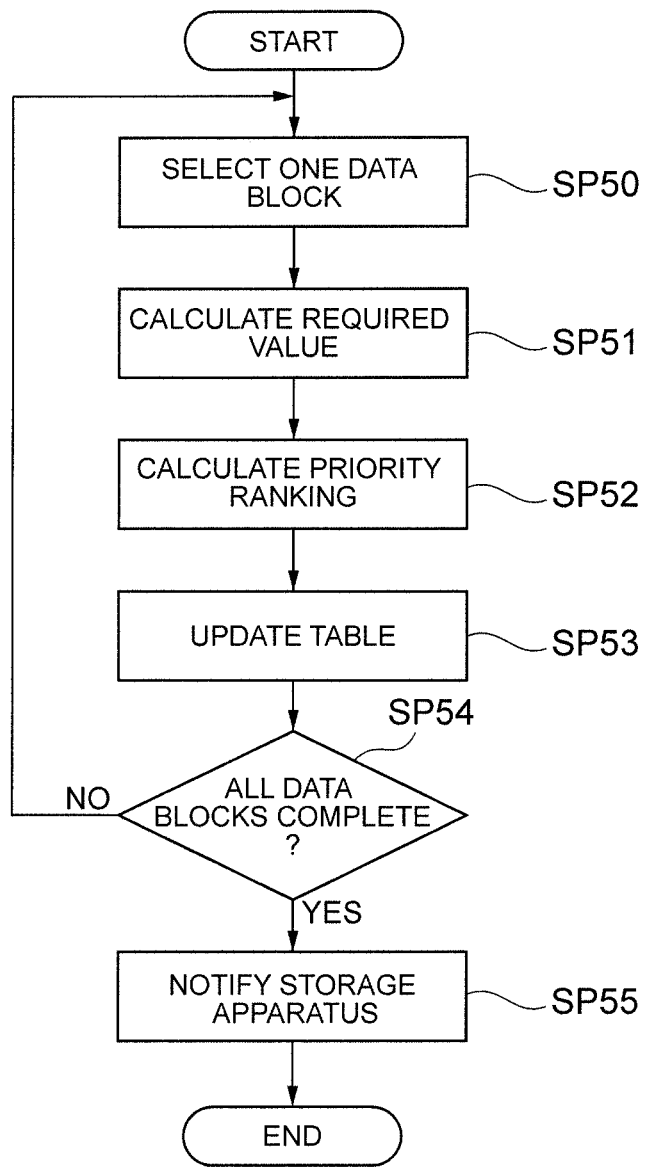
FIG. 21 shows a processing routine for data block priority ranking determination processing according to the second embodiment.

FIG. 21 shows a processing routine for the data block priority ranking determination processing according to the second embodiment that is executed by the data block priority ranking determination program 42 of the management server 41 instead of the data block priority ranking determination processing mentioned earlier with reference to FIG. 19.

The data block priority ranking determination program 42 starts the data block priority ranking determination processing at regular intervals and first selects one unprocessed data block DBL from among the data blocks DBL registered in the data block priority ranking management table 33 (FIG. 13) (SP50).

Thereafter, the data block priority ranking determination program 42 refers to the data block I/O history table 34, the data block migration history table 35, and the data block priority ranking management table 33 regarding the data block DBL selected in step SP50 in order to determine values for the write access amount W per unit time, the residual time B of the data in the SAS_HDD volume VOL2 or SATA_HDD volume VOL3, the average time interval A for migrating data stored in the data block DBL to an SSD from a SAS hard disk drive or SATA hard disk drive, and the function H(H).

Thereafter, the data block priority ranking determination program 42 calculates the priority rankings of the data blocks DBL as numerical values by using each of the values found in step SP51 (SP52), and updates the corresponding priority ranking field 33E (FIG. 13) in the data block priority ranking management table 33 on the basis of the calculation result (SP53).

The data block priority ranking determination program 42 then determines whether or not the same processing is complete for all the data blocks DBL registered in the data block priority ranking management table 33 (SP54).

When a negative result is obtained in this determination, the data block priority ranking determination program 42 returns to step SP50 and then repeats the processing of steps SP50 to SP54. Furthermore, when before long an affirmative result is obtained in step SP54 as a result of completing the same processing for all the data blocks DBL registered in the data block priority ranking management table 33, the data block priority ranking determination program 42 transmits the latest priority rankings of each of the data blocks DBL registered in the data block priority ranking management table 33 to the storage apparatus 3 together with a command to update the data block management table 26 (FIG. 10) (SP55).

When the data block management program 25 (FIG. 1) of the storage apparatus 3 accordingly receives this update command, the data block management program 25 updates the priority rankings of each of the data blocks DBL registered in the data block management table 26 as necessary, based on the latest priority rankings of each of the data blocks DBL transmitted from the management server 4 together with the update command.

The data block priority ranking determination program 42 then terminates the data block priority ranking determination processing.

(2-2) Effect of the Embodiment

As described hereinabove, the computer system 40 according to this embodiment calculates the priority rankings of each of the data blocks DBL registered in the data block priority ranking management table 33 as numerical values. Therefore, when deleting data of the data block DBL with the lowest priority ranking in step SP33 of the SSD volume unused capacity monitoring processing mentioned earlier with reference to FIG. 18, for example, unnecessary data in the data blocks DBL can be selected more accurately and deleted from the SSD volume VOL1.

According to the computer system 40 of this embodiment, the volume of data that is rewritten in the SSD volume VOL1 when data is restored to the SSD volume VOL1 from the SAS_HDD volume VOL2 or SATA_HDD volume VOL3 in the storage apparatus 3 can be kept to the required minimum, thereby enabling more effective promotion of effective usage of the memory apparatuses 23 while minimizing the maintenance costs and work caused by a shortening of the SSD's lifespan.

(3) Other Embodiments

Note that although the foregoing first and second embodiments explained a case in which the present invention is applied to the storage apparatus 3 configured as per FIG. 1, the present invention is not limited to such a case and may be widely applied to storage apparatuses with a variety of other configurations.

Furthermore, the foregoing first and second embodiments explained a case in which the priority rankings of each of the data blocks DBL of each of the virtual volumes VVOL defined in the storage apparatus 3 are determined in the management server 4, 41 but the present invention is not limited to such a case. The same function may also be installed in the storage apparatus 3 so that the priority rankings of each of the data blocks DBL are determined in the storage apparatus 3.

In addition, the foregoing first and second embodiments explained a case in which the present invention is applied when migrating data from the SSD volume VOL1 to the SAS_HDD volume VOL2 or SATA_HDD volume VOL3 and then restoring the data to the SSD volume VOL1. However, the present invention is not limited to such a case and can be widely applied to cases where data is migrated from a storage area provided by a storage device other than an SSD, for which there are limitations on the number of rewrites, to a storage area provided by another storage device, and where this data is then restored to the storage area provided by the storage device with limitations on the number of rewrites.

Moreover, the foregoing first and second embodiments explained a case in which a controller is configured by a CPU 20 and a data block management program 25 which govern the operations of the whole storage apparatus 3 and which controller executes the required data migration by monitoring the access frequency to each of the data blocks DBL of a virtual volume VVOL and controlling corresponding memory apparatuses 23 in order to allocate the storage area provided by the memory apparatus 23 with a higher response performance to the data blocks DBL with a higher access frequency. However, the present invention is not limited to this case: components with these functions may also be provided to the storage apparatus 3, discretely from the CPU 20.

The present invention can be applied to a storage apparatus for which a hierarchical storage management system is applied as a data management system.

What is claimed is:

1. A storage apparatus which provides a virtual volume to a host apparatus, and which, in response to a write request from the host apparatus with respect to the virtual volume, allocates storage areas dynamically to the virtual volume, the storage apparatus comprising:
   a plurality of memory apparatuses of a plurality of types; and
   a control unit for executing required data migration by monitoring an access frequency to each of a plurality of unit areas of the virtual volume and by controlling the corresponding memory apparatuses,
   wherein the control unit allocates a storage area having a superior response performance to unit areas having a higher access frequency the storage area being provided by the memory apparatus,
   wherein the plurality of unit areas in which the host apparatus reads data from and/or writes data to the virtual volume, and each of the plurality of unit areas comprises at least one of the plurality of storage areas,
   wherein the plurality of storage areas are dynamically allocated to the virtual volume in units of the storage areas of a predetermined size and,
   wherein the control unit;
   controls the corresponding memory apparatuses so that when data is migrated from a first storage area, provided by a first memory apparatus which can be rewritten a limited number of times, to a second storage area provided by second memory apparatus, the data is migrated to the second storage area without being deleted from the first storage area,
   manages updated units of storage areas of the data migrated from the first storage area to the second storage area after the data is migrated to the second storage area, and
   controls the corresponding memory apparatuses so that, when data which has been migrated from the first storage area to the second storage area is restored from the second storage area to the first storage area, the corresponding data still remaining in the first storage area is overwritten with the updated units of the storage areas of the data, the units of the storage areas being updated after migration to the second storage area.

2. The storage apparatus according to claim 1, wherein the first memory apparatus is an SSD (Solid State Drive).

3. The storage apparatus according to claim 1, wherein the control unit controls the corresponding memory apparatuses so that if the used capacity of the first storage area exceeds a predetermined threshold, data that remains in unit areas of the lowest priority ranking is deleted from the first storage area until the used capacity of the first storage area is equal to or less than the threshold, the unit areas of the lowest priority ranking being unit areas where the data remains without being deleted after the stored data is migrated to the second storage area on the basis of predetermined priority rankings for each of the unit areas of the virtual volume.

4. The storage apparatus according to claim 1, wherein the priority rankings of each of the unit areas of the virtual volume are determined on the basis of the update amount per unit time with respect to the unit area, and a migration frequency between the first and second storage areas that is forecast for the data stored in the unit area.

5. An hierarchical data management method of a storage apparatus which provides a virtual volume to a host apparatus and which, in response to a write request from the host apparatus with respect to the virtual volume, allocates storage areas dynamically to the virtual volume, the storage apparatus comprising:
   a plurality of memory apparatuses of a plurality of types; and
   a control unit for executing required data migration by monitoring an access frequency to each of a plurality of unit areas of the virtual volume and by controlling the corresponding memory apparatuses,
   wherein the control unit allocates a storage area having a superior response performance to unit areas having a higher access frequency, the storage area being provided by the memory,
   wherein the plurality of unit areas are units in which the host apparatus reads data from and/or writes data to the virtual volume, and each of the plurality of the unit areas comprises at least one of the plurality of storage areas,
   wherein the plurality of storage areas are dynamically allocated to the virtual volume units of the storage areas of a predetermined size, and
   wherein the hierarchical data management method comprises:
   a first step in which the control unit controls the corresponding memory apparatuses so that when data is migrated from a first storage area, provided by a first memory apparatus which can be rewritten a limited number of times, to a second storage area provided by second memory apparatus, the data is migrated to the second storage area without being deleted from the first storage area;
   a second step of managing updated units of the storages areas of the data migrated from the first storage area to the second storage area after the data is migrated to the second storage area; and
   a third step of controlling the corresponding memory apparatuses so that, when data which has been migrated from the first storage area to the second storage area is restored from the second storage area to the first storage area, the corresponding data still remaining in the first storage area is overwritten with the updated units of the storage areas of the data, the units of the storage areas being updated after migration to the second storage area.

6. The hierarchical data management method according to claim 5,
wherein the first memory apparatus is an SSD (Solid State Drive).

7. The hierarchical data management method according to claim 5, further comprising:
a fourth step in which the control unit controls the corresponding memory apparatuses so that if the used capacity of the first storage area exceeds a predetermined threshold, data that remains in unit areas of the lowest priority ranking is deleted from the first storage area until the used capacity of the first storage area is equal to or less than the threshold, the unit areas of the lowest priority being unit areas where the data remains without being deleted after the stored data is migrated to the second storage area on the basis of predetermined priority rankings for each of the unit areas of the virtual volume.

8. The hierarchical data management method according to claim 5, wherein the priority rankings of each of the unit areas of the virtual volume are determined on the basis of the update amount per unit time with respect to the unit area, and a migration frequency between the first and second storage areas that is forecast for the data stored in the unit area.

9. A storage apparatus which provides a virtual volume to a host apparatus, and which, in response to a write request from the host apparatus with respect to the virtual volume, allocates storage areas dynamically to the virtual volume, the storage apparatus comprising:
a plurality of memory apparatuses of a plurality of types; and
a control unit for executing required data migration by monitoring an access frequency to each of a plurality of unit areas of the virtual volume and by controlling the corresponding memory apparatuses,
wherein the control unit allocates a storage area having a superior response performance to unit areas having a higher access frequency, the storage area being provided by the memory apparatus,
wherein the plurality of unit areas are units in which the host apparatus reads data from and/or writes data to the virtual volume, and each of the plurality of unit areas comprises at least one of the plurality of storage areas,
wherein the plurality of storage areas are dynamically allocated to the virtual volume in units of the storage areas of a predetermined size,
wherein the control unit:
controls the corresponding memory apparatuses so that when data is migrated from a first storage area, provided by a first memory apparatus which can be rewritten a limited number of times, to a second storage area provided by second memory apparatus, the data is migrated to the second storage area without being deleted from the first storage area,
manages updated units of the storage areas of the data migrated from the first storage area to the second storage area after the data is migrated to the second storage area, and
controls the corresponding memory apparatuses so that, when data which has been migrated from the first storage area to the second storage area is restored from the second storage area to the first storage area, the corresponding data still remaining in the first storage area is overwritten with the updated units of the storage areas of the data, the units of the storage areas being updated after migration to the second storage area, and
wherein the priority rankings of each of the unit areas of the virtual volume are determined on the basis of the update amount per unit time with respect to the unit area, and a migration frequency between the first and second storage areas that is forecast for the data stored in the unit area.

10. An hierarchical data management method of a storage apparatus which provides a virtual volume to a host apparatus and which, in response to a write request from the host apparatus with respect to the virtual volume, allocates storage areas dynamically to the virtual volume, the storage apparatus comprising:
a plurality of memory apparatuses of a plurality of types; and
a control unit for executing required data migration by monitoring an access frequency to each of a plurality of unit areas of the virtual volume and by controlling the corresponding memory apparatuses,
wherein the control unit allocates a storage area having a superior response performance to unit areas having a higher access frequency, the storage area being provided by the memory,
wherein the plurality of unit areas are units in which the host apparatus reads data from and/or writes data to the virtual volume, and each of the plurality of unit areas comprises at least one of the plurality of storage areas,
wherein the plurality of storage areas are dynamically allocated to the virtual volume in units of the storage areas of a predetermined size,
wherein the hierarchical data management method comprises:
a first step in which the control unit controls the corresponding memory apparatuses so that when data is migrated from a first storage area, provided by a first memory apparatus which can be rewritten a limited number of times, to a second storage area provided by second memory apparatus, the data is migrated to the second storage area without being deleted from the first storage area;
a second step of managing updated units of the storages areas of the data migrated from the first storage area to the second storage area after the data is migrated to the second storage area; and
a third step of controlling the corresponding memory apparatuses so that, when data which has been migrated from the first storage area to the second storage area is restored from the second storage area to the first storage area, the corresponding data still remaining in the first storage area is overwritten with the updated units of the storage areas of the data, the units of the storage areas being updated after migration to the second storage area, and
wherein the priority rankings of each of the unit areas of the virtual volume are determined on the basis of the update amount per unit time with respect to the unit area, and a migration frequency between the first and second storage areas that is forecast for the data stored in the unit area.

* * * * *